(12) United States Patent
Oh et al.

(10) Patent No.: US 12,724,463 B2
(45) Date of Patent: Sep. 1, 2026

(54) WINDOW AND DISPLAY DEVICE INCLUDING THE SAME

(71) Applicant: Samsung Display Co., Ltd., Yongin-si (KR)

(72) Inventors: Hyunseok Oh, Yongin-si (KR); Seung-Won Kuk, Yongin-si (KR); Aely Oh, Yongin-si (KR); Kang-Woo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 370 days.

(21) Appl. No.: 18/466,065

(22) Filed: Sep. 13, 2023

(65) Prior Publication Data

US 2024/0241549 A1 Jul. 18, 2024

(30) Foreign Application Priority Data

Jan. 9, 2023 (KR) ........................ 10-2023-0003006

(51) Int. Cl.
*G06F 1/16* (2006.01)
*C08F 222/10* (2006.01)
(Continued)

(52) U.S. Cl.
CPC ...... *G06F 1/1656* (2013.01); *C08F 222/1061* (2020.02); *C08K 3/22* (2013.01);
(Continued)

(58) Field of Classification Search
None
See application file for complete search history.

(56) References Cited

U.S. PATENT DOCUMENTS 8,372,504 B2 2/2013 Bae et al.
10,020,462 B1 7/2018 Ai et al.
(Continued)

FOREIGN PATENT DOCUMENTS

JP 2011105784 A * 6/2011
KR 10-2005-0010776 1/2005
(Continued)

OTHER PUBLICATIONS

Chen et al., ("Pixelligent; White Paper: Low Chromatic Aberration Nanocomposite," Nov. 2015) (Year: 2015).*

*Primary Examiner* — David Sample
(74) *Attorney, Agent, or Firm* — Sughrue Mion, PLLC

(57) ABSTRACT

Embodiments provide a window and a display device including the window. The window includes a base substrate including a first surface and a second surface which face each other, and a filling portion. The base substrate has a concave portion defined on at least one of the first surface and the second surface, a difference between a refractive index of the base substrate at a wavelength of about 589 nm and a refractive index of the filling portion is less than or equal to about 0.02, a difference between an Abbe No. of the base substrate and an Abbe No. of the filling portion is less than or equal to about 5.0, and the filling portion fills the concave portion. The window and the display thus exhibits satisfactory folding properties and impact resistance, as well as improved optical properties and display quality that prevent reflection color from being viewed.

24 Claims, 12 Drawing Sheets

(51) Int. Cl.
*C08K 3/22* (2006.01)
*C08K 3/36* (2006.01)

(52) U.S. Cl.
CPC .............. *C08K 3/36* (2013.01); *G06F 1/1616* (2013.01); *G06F 1/1641* (2013.01); *G06F 1/1652* (2013.01); *C08K 2003/2227* (2013.01); *C08K 2201/011* (2013.01)

(56) References Cited

U.S. PATENT DOCUMENTS

| | | | |
|---|---|---|---|
| 11,322,054 | B2 | 5/2022 | Park et al. |
| 2007/0219309 | A1 | 9/2007 | Shibahara et al. |
| 2013/0164493 | A1 | 6/2013 | Hirai |
| 2014/0273686 | A1 | 9/2014 | Eguchi et al. |
| 2018/0217639 | A1* | 8/2018 | Jones .................... G06F 1/1616 |
| 2022/0091637 | A1 | 3/2022 | Kuon et al. |
| 2022/0107499 | A1* | 4/2022 | Amitai ............... G02B 27/0081 |
| 2022/0291712 | A1* | 9/2022 | Baby ..................... G06F 1/1616 |
| 2022/0390985 | A1* | 12/2022 | Lee ....................... G06F 1/1616 |
| 2022/0404869 | A1 | 12/2022 | Kim et al. |

FOREIGN PATENT DOCUMENTS

| | | |
|---|---|---|
| KR | 10-1228408 | 1/2013 |
| KR | 10-2013-0071941 | 7/2013 |
| KR | 10-2013-0076612 | 7/2013 |
| KR | 10-2014-0095499 | 8/2014 |
| KR | 10-1669317 | 10/2016 |
| KR | 10-2018-0079093 | 7/2018 |
| KR | 10-2068729 | 1/2020 |
| KR | 10-2022-0037704 | 3/2022 |
| KR | 10-2022-0168640 | 12/2022 |

* cited by examiner

WINDOW AND DISPLAY DEVICE INCLUDING THE SAME

CROSS-REFERENCE TO RELATED APPLICATION(S)

This application claims priority to and benefits of Korean Patent Application No. 10-2023-0003006 under 35 U.S.C. § 119, filed on Jan. 9, 2023 in the Korean Intellectual Property Office, the entire contents of which are incorporated herein by reference.

BACKGROUND

1. Technical Field

The disclosure relates to a foldable window and a display device including the same.

2. Description of the Related Art

Various types of display devices are being used to provide image information, and display devices including flexible display panels that are foldable or bendable have been developed lately. The flexible display devices, unlike rigid display devices, are variously modifiable in shape by being foldable, rollable, or bendable, and thus have portability without being limited to display screen sizes.

Such flexible display devices require a window that serves to protect a display panel without hindering an operation of folding or bending. In particular, as a cover window of a flexible display device, a window having excellent mechanical properties and excellent folding properties, as well as optical properties that do not degrade display quality of a display device in a folding region needs to be developed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a window having satisfactory mechanical properties and excellent optical properties by reducing reflection color in a folding portion.

The disclosure also provides a display device including a window having satisfactory mechanical properties and excellent optical properties.

An embodiment provides a window which may include a base substrate including a first surface and a second surface which face each other, and a filling portion, wherein the base substrate may have a concave portion defined on at least one of the first surface and the second surface, a difference between a refractive index of the base substrate at a wavelength of about 589 nm and refractive index of the filling portion may be less than or equal to about 0.02, a difference between an Abbe No. of the base substrate and an Abbe No. of the filling portion may be less than or equal to about 5.0, and the filling portion may fill the concave portion.

In an embodiment, the window may include a folding portion which is foldable with respect to a virtual folding axis extending in one direction, and a non-folding portion adjacent to the folding portion; and the concave portion may be defined in the folding portion.

In an embodiment, the base substrate may be a glass substrate; and the filling portion may include nanoparticles that include at least one of $Al_2O_3$ and glass particles, and an acrylic polymer resin.

In an embodiment, the filling portion may be formed through a polymerization reaction of a resin composition that includes a base resin including two or more types of acrylic monomers that are different from each other, a crosslinking agent, a photoinitiator, and the nanoparticles.

In an embodiment, an amount of the nanoparticles in the resin composition may be in a range of about 0.1 wt % to about 10 wt %, with respect to 100 wt % of the base resin.

In an embodiment, the base resin may include an acrylic monomer represented by Formula 1:

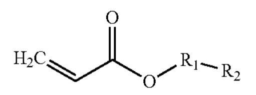

In Formula 1, $R_1$ may be O (oxygen), a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms; $R_2$ may be a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms; and at least one of $R_1$ and $R_2$ may include a substituted or unsubstituted aryl group having 6 to 18 carbon atoms.

In an embodiment, an amount of the acrylic monomer represented by Formula 1 in the base resin may be in a range of about 10 wt % to about 40 wt %, with respect to 100 wt % of the base resin.

In an embodiment, a refractive index of the filling portion may be in a range of about 1.49 to about 1.51 at a wavelength of about 589 nm; and the filling portion may have an Abbe No. in a range of about 45 to about 50.

In an embodiment, a glass transition temperature of the filling portion may be less than or equal to about −20° C.; and the filling portion may have an elongation greater than or equal to about 200%.

In an embodiment, the window may further include a cover layer disposed on a surface of the base substrate in which the concave portion is defined, wherein the cover layer may include a same material as the filling portion.

In an embodiment, the cover layer may be formed as a single body with the filling portion.

In an embodiment, a thickness of a portion of the base substrate in which the concave portion is not defined may be greater than or equal to about 100 μm.

An embodiment provides a display device which may include a display module, and a window disposed on the display module, wherein the window may include a base substrate including a first surface and a second surface which face each other, and a filling portion; the base substrate may have a concave portion defined on at least one of the first surface and the second surface; a difference between a refractive index of the base substrate at a wavelength of about 589 nm and a refractive index of the filling portion at a wavelength of about 589 nm may be less than or equal to about 0.02, a difference between an Abbe No. of the base substrate and an Abbe No. of the filling portion may be less than or equal to about 5.0, and the filling portion may fill the concave portion.

In an embodiment, the display module may include a folding display portion which is foldable with respect to a folding axis extending in one direction, and a non-folding display portion adjacent to the folding display portion; the window may include a folding portion corresponding to the folding display portion, and a non-folding portion corresponding to the non-folding display portion; and the concave portion may be defined in the folding portion.

In an embodiment, the base substrate may be a glass substrate; and the filling portion may include nanoparticles that include at least one of $Al_2O_3$ and glass particles, and an acrylic polymer resin.

In an embodiment, the acrylic polymer resin may be formed through a polymerization reaction of a base resin including two or more types of acrylic monomers that are different from each other; and the base resin may include an acrylic monomer represented by Formula 1:

[Formula 1]

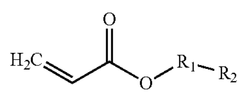

In Formula 1, $R_1$ may be O (oxygen), a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms; $R_2$ may be a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms; and at least one of $R_1$ and $R_2$ may include a substituted or unsubstituted aryl group having 6 to 18 carbon atoms.

In an embodiment, an amount of the nanoparticles in the display device may be in a range of about 0.1 wt % to about 10 wt %, with respect to 100 wt % of the base resin.

In an embodiment, a refractive index of the filling portion may be in a range of about 1.49 to about 1.51 at a wavelength of about 589 nm; and the filling portion may have an Abbe No. in a range of about 45 to about 50.

In an embodiment, a glass transition temperature of the filling portion may be less than or equal to about −20° C.; and the filling portion may have an elongation greater than or equal to about 200%.

In an embodiment, the window may further include a cover layer disposed on a surface of the base substrate in which the concave portion is defined; and the cover layer may include a same material as the filling portion.

An embodiment provides a display device which may include a folding region which is foldable with respect to a virtual folding axis extending in one direction, a non-folding region adjacent to the folding region, a display module, and a window made of glass disposed on the display module, wherein the window may include a lower surface adjacent to the display module, an upper surface facing the lower surface, a concave portion depressed from at least one of the upper surface and the lower surface, and a filling portion filled in the concave portion; a refractive index of the filling portion may be in a range of about 0.49 to about 1.51 at a wavelength of about 589 nm; and the filling portion may have an Abbe No. in a range of about 45 to about 50.

In an embodiment, a glass transition temperature of the filling portion may be less than or equal to about −20° C., and the filling portion may have an elongation greater than or equal to about 200%.

In an embodiment, the filling portion may include nanoparticles that include at least one of $Al_2O_3$ and glass particles, and an acrylic polymer resin.

In an embodiment, the filling portion may be formed through a polymerization reaction of a resin composition that includes a base resin including two or more types of acrylic monomers that are different from each other, a crosslinking agent, a photoinitiator, and the nanoparticles.

In an embodiment, an amount of the nanoparticles in the resin composition may be in a range of about 0.1 wt % to about 10 wt %, with respect to 100 wt % of the base resin.

In an embodiment, the base resin may include an acrylic monomer represented by Formula 1:

[Formula 1]

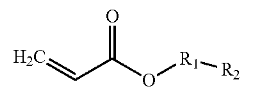

In Formula 1, $R_1$ may be O (oxygen), a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms; $R_2$ may be a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms; and at least one of $R_1$ and $R_2$ may include a substituted or unsubstituted aryl group having 6 to 18 carbon atoms.

In an embodiment, an amount of the acrylic monomer represented by Formula 1 in the base resin may be in a range of about 10 wt % to about 40 wt %, with respect to 100 wt % of the base resin.

It is to be understood that the embodiments above are described in a generic and explanatory sense only and not for the purposes of limitation, and the disclosure is not limited to the embodiments described above.

BRIEF DESCRIPTION OF THE DRAWINGS

The accompanying drawings are included to provide a further understanding of the embodiments, and are incorporated in and constitute a part of this specification. The drawings illustrate embodiments of the disclosure and principles thereof. The above and other aspects and features of the disclosure will become more apparent by describing in detail embodiments thereof with reference to the accompanying drawings, in which.

DETAILED DESCRIPTION OF THE EMBODIMENTS

Figure 1A:
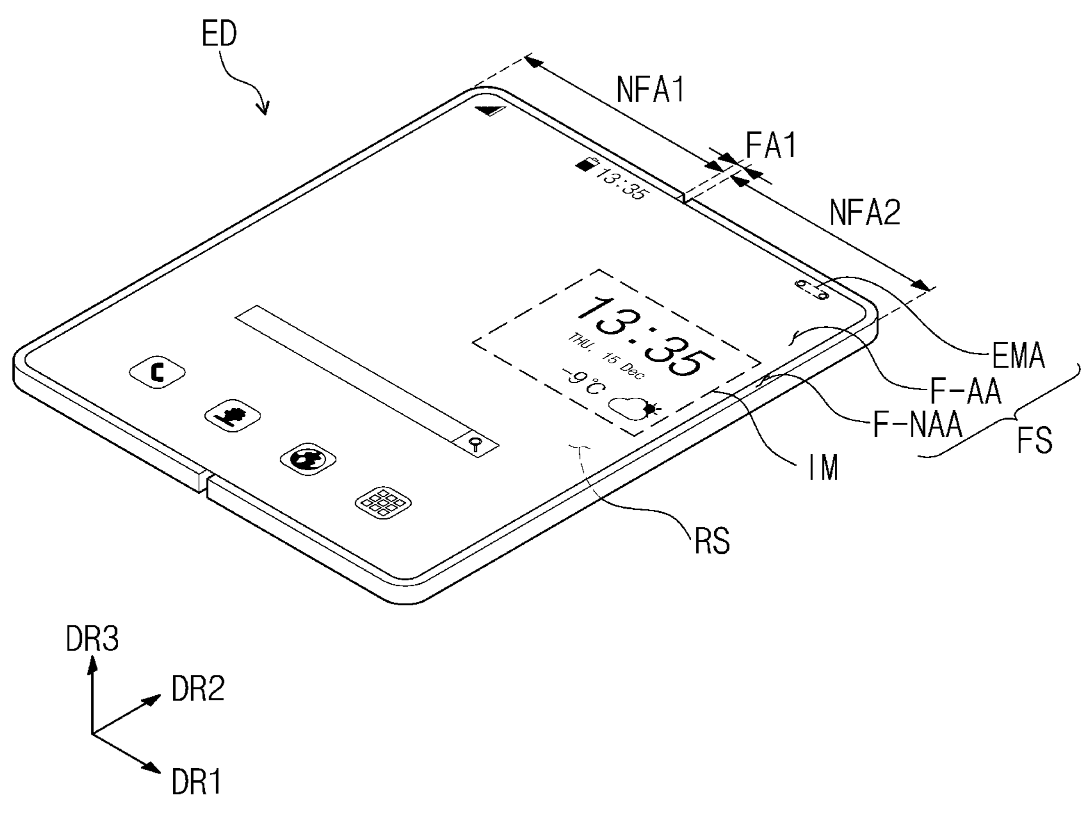
FIG. 1A is a schematic perspective view in which a display device according to an embodiment is in an unfolded state.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like reference numbers and reference characters refer to like elements throughout.

In the specification, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the specification, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group consisting of" for the purpose of its meaning and interpretation. For example, "at least one of A, B, and C" may be understood to mean A only, B only, C only, or any combination of two or more of A, B, and C, such as ABC, ACC, BC, or CC. When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device.

Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, ±10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a window according to an embodiment and a display device according to an embodiment will be described with reference to the accompanying drawings.

Figure 1B:
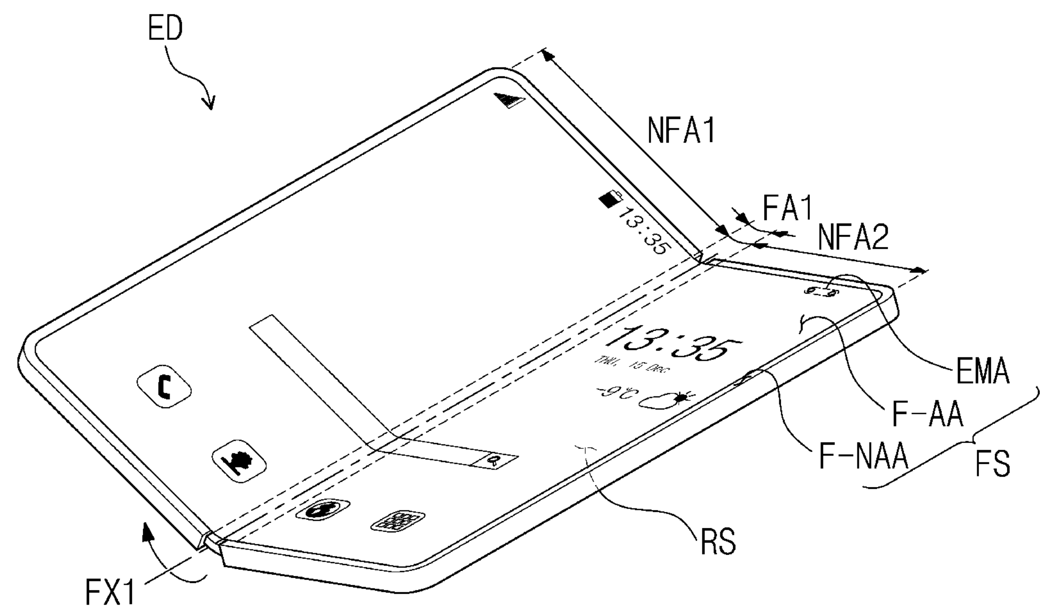
FIG. 1B is a schematic perspective view of the display device according to an embodiment shown in FIG. 1A during an inward folding process.
Figure 1B:
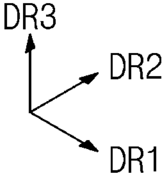
Figure 1C:
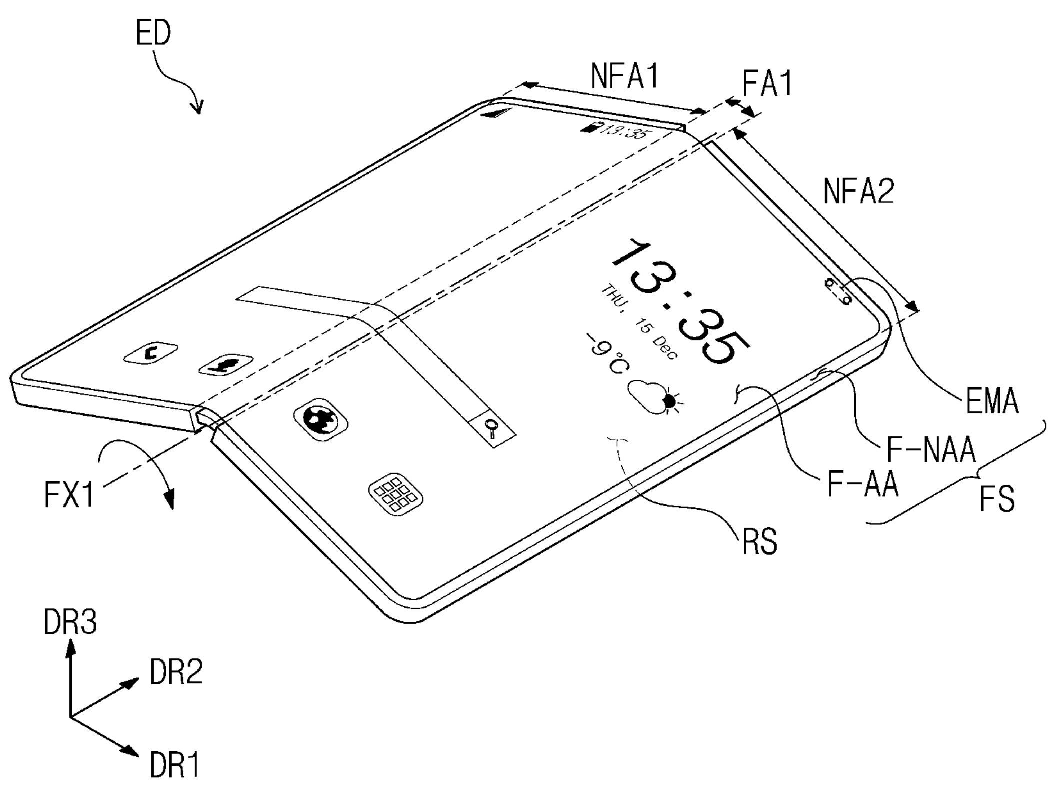
FIG. 1C is a schematic perspective view of the display device according to an embodiment shown in FIG. 1A during an outward folding process.

FIG. 1A is a schematic perspective view in which a display device according to an embodiment is in an unfolded state. FIG. 1B is a schematic perspective view of the display device shown in FIG. 1A during an inward folding process. FIG. 1C is a schematic perspective view of the display device shown in FIG. 1A during an outward folding process.

A display device ED may be a device activated according to electrical signals. For example, the display device ED may be a mobile phone, a tablet, a car navigation system, a game console, or a wearable device, but embodiments are not limited thereto. In the specification with respect to FIG. 1A and the like, the display device ED is shown as a mobile phone as an example.

Referring to FIGS. 1A to 1C, the display device ED according to an embodiment may include a first display surface FS defined by a first directional axis DR1 and a second directional axis DR2 crossing the first directional axis DR1. The display device ED may provide an image IM to users through the first display surface FS. The display device ED according to an embodiment may display an image IM towards the third directional axis DR3 on the first display surface FS parallel to a first directional axis DR1 and a second directional axis DR2. In the description, a front surface (or an upper surface) and a rear surface (or a lower surface) of respective members are defined with respect to a direction in which the image IM is displayed. Front and rear surfaces may oppose each other in a third directional axis DR3 and the normal direction of each of the front and rear surfaces may be parallel to the third directional axis DR3.

The display device ED according to an embodiment may include the first display surface FS and a second display surface RS. The first display surface FS may include an active region F-AA and a peripheral region F-NAA. The active region F-AA may include an electronic module region EMA. The second display surface RS may be defined as a surface facing at least a portion of the first display surface FS. For example, the second display surface RS may be defined as a portion of the rear surface of the display device ED.

The display device ED according to an embodiment may detect external inputs applied from the outside. The external inputs may include various forms of inputs provided from outside the display device ED. For example, the external inputs may include external inputs applied when approaching the display device ED or being adjacent within a selected distance (e.g., hovering), as well as contact by body parts such as a user's hand. The external inputs may have various forms such as force, pressure, temperature, light, and the like.

FIG. 1A and the following drawings illustrate the first to third directional axes DR1 to DR3, and directions indicated by the first to third directional axes DR1, DR2, and DR3 described herein are relative terms, and may thus be changed to other directions. The directions indicated by the first to third directional axes DR1, DR2, and DR3 may be described as first to third directions, and the same reference numerals may be used.

The active region F-AA of the display device ED may be a region activated according to electrical signals. The display device ED according to an embodiment may display the image IM through the active region F-AA. The active region F-AA may detect various forms of external inputs. The peripheral region F-NAA is adjacent to the active region F-AA. The peripheral region F-NAA may have a color (e.g., a predetermined or selected color). The peripheral region F-NAA may surround the active region F-AA. Accordingly, the shape of the active region F-AA may be substantially defined by the peripheral region F-NAA. However, this is shown as an example, and the peripheral region F-NAA may be disposed adjacent to only one side of the active region F-AA, or may be omitted. The display device ED according to an embodiment may include various forms of active regions and is not limited to any one embodiment.

The display device ED may include a folding region FA1 and non-folding regions NFA1 and NFA2. In an embodiment, the non-folding regions NFA1 and NFA2 may be disposed adjacent to the folding region FA1 with the folding region FA1 therebetween. The display device ED may include a first non-folding region NFA1 and a second non-folding region NFA2, which are spaced apart with the folding region FA1 therebetween along the first direction DR1. For example, the first non-folding region NFA1 may be disposed at a side of the folding region FA1 in the first direction DR1, and the second non-folding region NFA2 may be disposed at another side of the folding region FA1 in the first direction DR1.

FIGS. 1A to 1C shows an embodiment of the display device ED including one folding region FA1, but embodiments are not limited thereto. In the display device ED, multiple folding regions may be defined. For example, the display device according to an embodiment may include two or more folding regions and three or more non-folding regions disposed with each of the folding regions therebetween.

Referring to FIG. 1B, the display device ED according to an embodiment may be folded with respect to a first folding axis FX1. The first folding axis FX1 is a virtual axis extending parallel to the second directional axis DR2, and the first folding axis FX1 may be parallel to a longer side of the display device ED. The first folding axis FX1 may extend along the second direction DR2 on the first display surface FS.

The display device ED may be folded inward with respect to the first folding axis FX1 such that a region overlapping the first non-folding region NFA1 and another region overlapping the second non-folding region NFA2 on the first display surface FS face each other.

In the display device ED according to an embodiment, the second display surface RS may be viewed in an inwardly folded state by users. The second display surface RS may further include an electronic module region in which an electronic module including various components is disposed, and is not limited to any one embodiment.

Referring to FIG. 1C, the display device ED may be folded outward with respect to the first folding axis FX1 such that a region overlapping the first non-folding region NFA1 and another region overlapping the second non-folding region NFA2 on the second display surface RS face each other.

However, embodiments are not limited thereto, and the display device ED may be folded with respect to multiple folding axes such that portions of each of the first display surface FS and the second display surface RS may face each other, and the number of folding axes and the number of the corresponding non-folding regions are not particularly limited.

The electronic module region EMA may include various electronic modules disposed therein. For example, the electronic module may include at least one of a camera, a speaker, a light detection sensor, and a heat detection sensor. The electronic module region EMA may detect an external subject received through the first and second display surfaces FS and RS, or provide sound signals such as voice to the outside through the first and second display surfaces FS and RS. The electronic modules may include multiple components, and are not limited to any one embodiment.

The electronic module region EMA may be surrounded by the active region F-AA and the peripheral region F-NAA. However, embodiments are not limited thereto, and the electronic module region EMA may be disposed in the active region F-AA, but is not limited to any one embodiment.

Figure 2A:
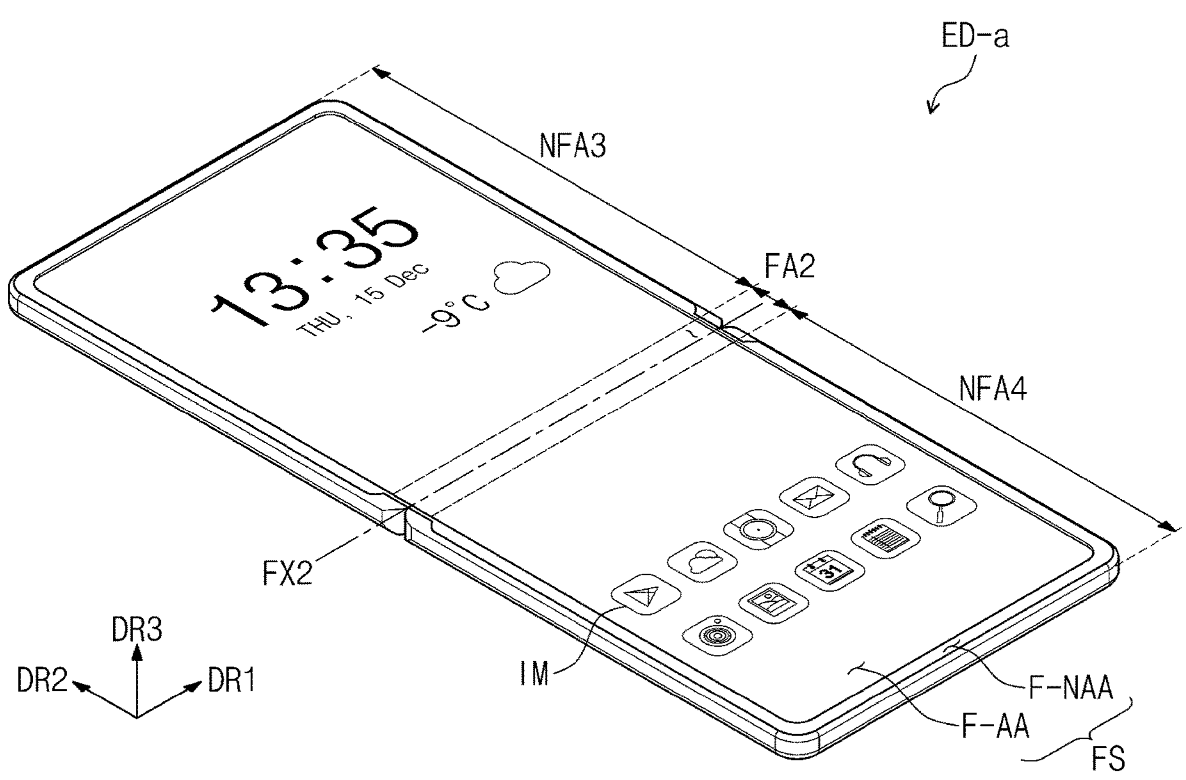
FIG. 2A is a schematic perspective view in which a display device according to an embodiment is in an unfolded state.
Figure 2B:
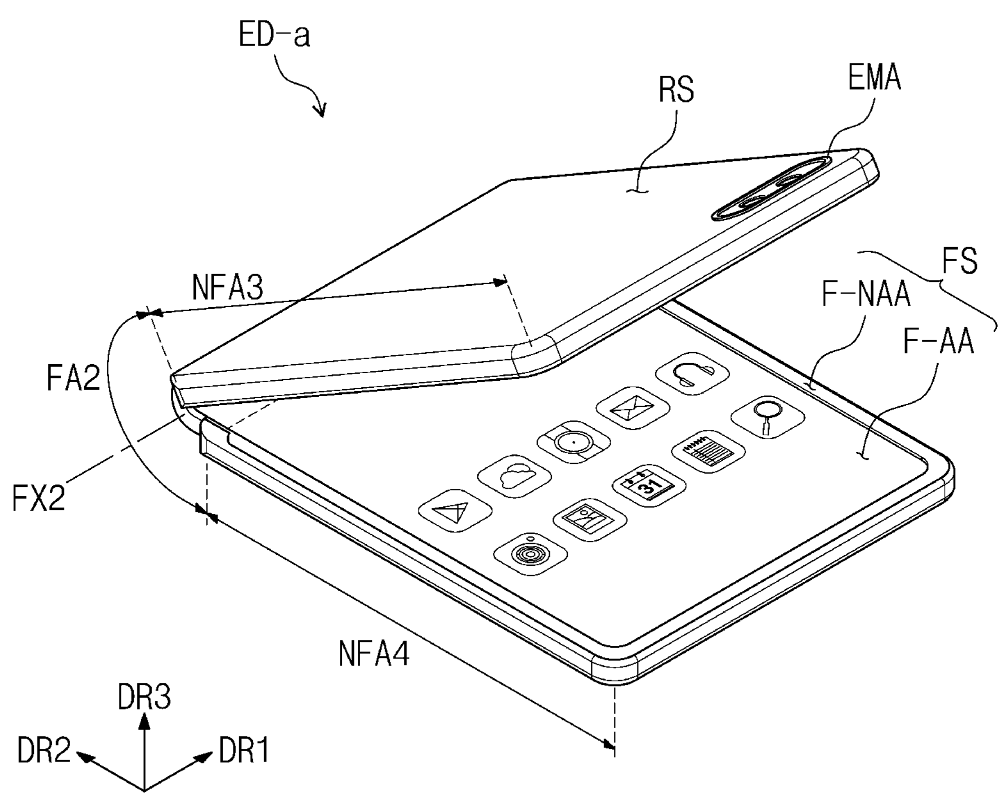
FIG. 2B is a schematic perspective view of the display device according to an embodiment shown in FIG. 2A during an inward folding process.
Figure 2C:
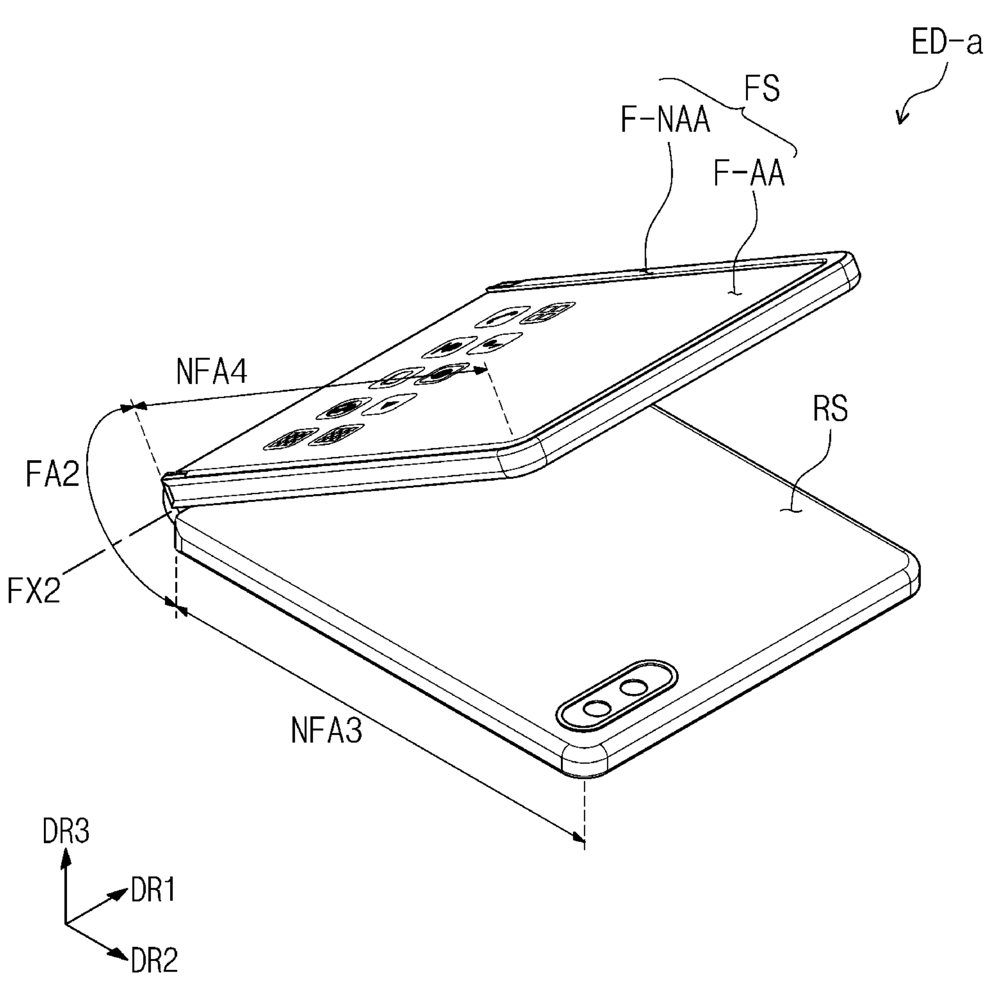
FIG. 2C is a schematic perspective view of the display device according to an embodiment shown in FIG. 2A during an outward folding process.

FIG. 2A is a schematic perspective view in which a display device according to an embodiment is in an unfolded state. FIG. 2B is a schematic perspective view of the display device shown in FIG. 2A during an inward folding process. FIG. 2C is a schematic perspective view of the display device shown in FIG. 2A during an outward folding process.

A display device ED-a according to an embodiment may be folded with respect to a second folding axis FX2 extending parallel to the first directional axis DR1. FIG. 2B shows an embodiment in which the second folding axis FX2 extends in a direction that is parallel to a shorter side of the display device ED-a. However, embodiments are not limited thereto.

The display device ED-a according to an embodiment may include at least one folding region FA2 and non-folding regions NFA3 and NFA4 adjacent to the folding region FA2. The non-folding regions NFA3 and NFA4 may be disposed to be spaced apart from each other with the folding region FA2 therebetween.

The folding region FA2 may have a curvature (e.g., a predetermined or selected curvature) and a radius of curvature (e.g., a predetermined or selected radius of curvature). In an embodiment, the first non-folding region NFA3 and the second non-folding region NFA4 may face each other, and the display device ED-a may be folded inward such that the display surface FS is not exposed to the outside. Referring to FIG. 2C, in an embodiment, the display device ED-a may be folded outward such that the first display surface FS is exposed to the outside.

The display device ED-a according to an embodiment may include a second display surface RS, and the second display surface RS may be defined as a surface facing at least a portion of the first display surface FS. The second display surface RS may include an electronic module region EMA which may include electronic modules including various components disposed therein. In an embodiment, images or videos may be displayed on at least a portion of the second display surface RS.

In an embodiment, when the display device ED-a is in an unfolded state, the first display surface FS may be viewed by users, and when the display device ED-a is folded inward, the second display surface RS may be viewed by users.

In an embodiment, the display devices ED and ED-a may be configured such that an inward folding process or an inward folding process may be respectively repeated from an unfolded state, but embodiments are not limited thereto. In an embodiment, the display devices ED and ED-a may be configured such that any one of an unfolded state, an inward folded state, or an outward folded state may be selected by a user. When multiple folding regions are included, a folding direction of at least one of the folding regions may be different from a folding direction of the remaining folding regions. For example, when two folding regions are included, two non-folding regions with one folding region therebetween may be folded by an inward folding process, and two other non-folding regions with the other folding region therebetween may be folded through an outward folding process.

Figure 3:
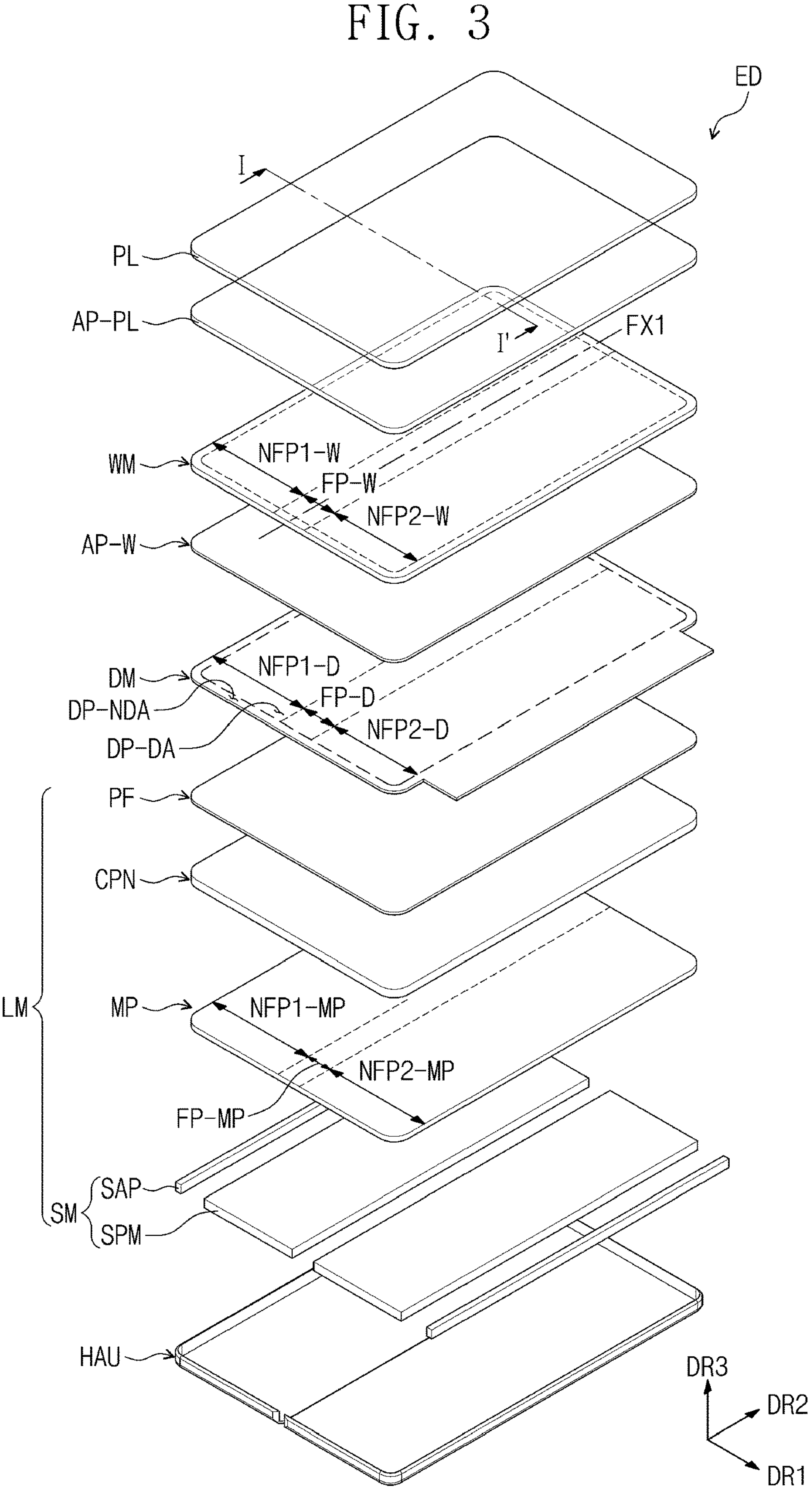
FIG. 3 is an exploded perspective view of a display device according to an embodiment.
Figure 4:
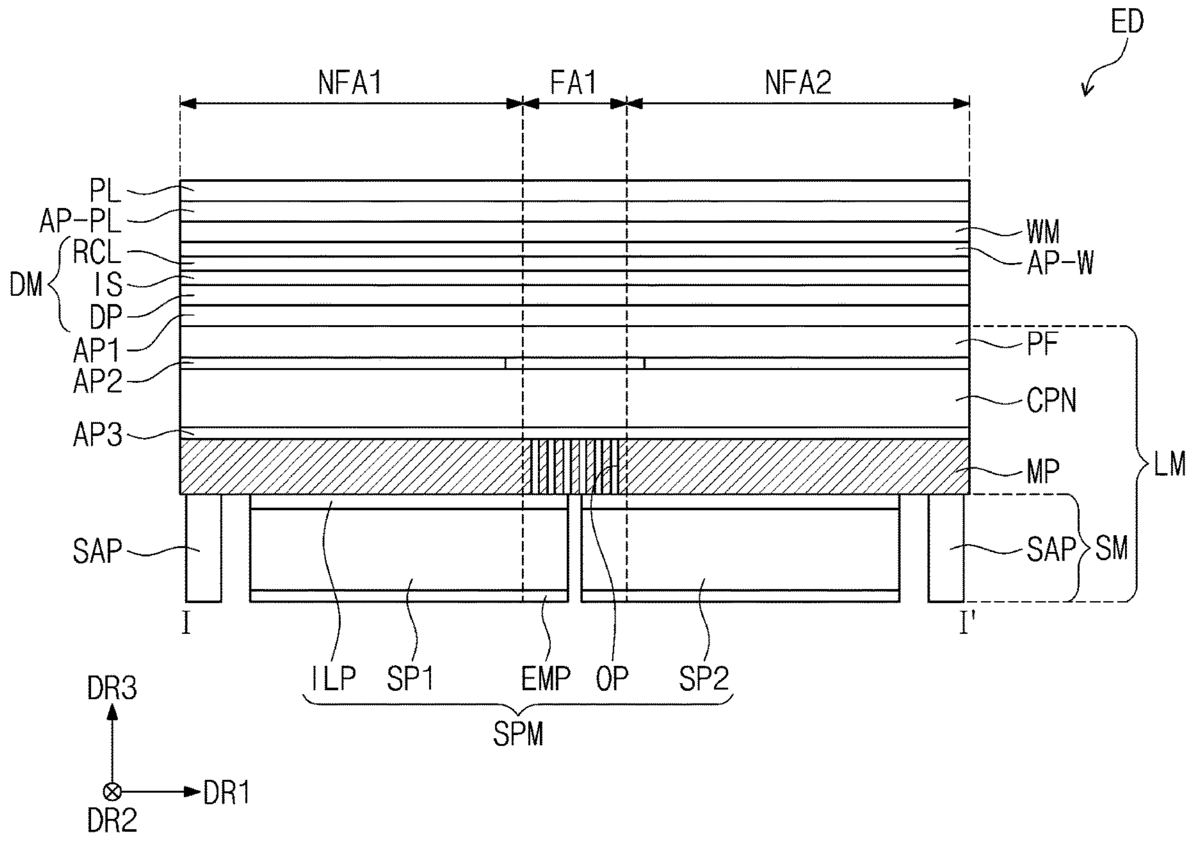
FIG. 4 is a schematic cross-sectional view of a display device according to an embodiment.

FIG. 3 is an exploded perspective view of a display device according to an embodiment, and FIG. 4 is a schematic cross-sectional view of a display device according to an embodiment. FIG. 3 shows an exploded perspective view of a display device according to an embodiment shown in FIG. 1A as an example. FIG. 4 is a schematic cross-sectional view showing a portion corresponding to line I-I' of FIG. 3.

FIGS. 3 and 4 show an embodiment in which a folding axis FX1 of the display device ED as shown in FIG. 1A and the like is parallel to a longer side of the display device ED. However, embodiments are not limited thereto, and in the descriptions of a display device and a window according to embodiments which will be described below with reference to the drawings may also apply to a case in which a folding axis FX2 is parallel to a shorter side of the display device, as shown in FIG. 2A and the like.

Referring to FIGS. 3 and 4, the display device ED according to an embodiment may include a display module DM and a window WM disposed on the display module DM. The display device ED may further include a lower module LM disposed below the display module DM.

The display device ED may further include a window adhesive layer AP-W disposed between the display module DM and the window WM, and may further include a protection film PL and an adhesive protection layer AP-PL disposed on the window WM. In another embodiment, the protection film PL and the adhesive protection layer AP-PL may be omitted from the display device ED. When the protection film PL and the adhesive protection layer AP-PL are omitted, the window WM may define an uppermost surface of the display device ED.

The lower module LM may include a support plate MP disposed below the display module DM. The lower module LM may also be referred to as a support member.

The display device ED may include a housing HAU accommodating the display module DM, the lower module LM, and the like. The housing HAU may be bonded to the window WM. Although not shown in the drawings, the housing HAU may further include a hinge structure so that the display device ED may be more readily folded or bent. The window WM may be a cover window disposed on the display module DM.

The display device ED may include a window adhesive layer AP-W disposed between display module DM and the window WM. The window adhesive layer AP-W may be an optically clear adhesive film (OCA) or an optically clear adhesive resin layer (OCR). In another embodiment, the window adhesive layer AP-W may be omitted.

The window WM may cover the entire upper surface of the display module DM. The window WM may have a shape corresponding to the shape of the display module DM. The window WM includes glass and may be used as a cover window of the display device ED.

The window WM may include a folding portion FP-W and non-folding portions NFP1-W and NFP2-W. The first non-folding portion NFP1-W and the second non-folding portion NFP2-W of the window WM may be spaced apart in the first direction DR1 with the folding portion FP-W therebetween. The folding portion FP-W may be a portion corresponding to the folding region FA1 (see FIG. 1A) of the display device ED, and the non-folding portions NFP1-W and NFP2-W may be portions respectively corresponding to the non-folding regions NFA1 and NFA2 (see FIG. 1A) of the display device ED.

In an embodiment, the window WM may be a cover window made of glass. For example, the window WM may include tempered glass, and may be foldable with respect to the folding portion FP-W, such that the first non-folding portion NFP1-W and the second non-folding portion NFP2-W may face each other when the display device ED is in a folded state. The window WM according to an embodiment will be described in more detail later.

The display module DM may display images according to electrical signals and transmit and receive information about external inputs. The display module DM may include a display region DP-DA and a non-display region DP-NDA. The display region DP-DA may be defined as a region outputting images provided from the display module DM.

The non-display region DP-NDA is adjacent to the display region DP-DA. For example, the non-display region DP-NDA may surround the display region DP-DA. However, this is shown as an example, and the non-display region DP-NDA may be defined in various shapes, and is not limited to any one embodiment. According to an embodiment, the display region DP-DA of the display module DM may correspond to at least a portion of the active region F-AA (see FIG. 1A).

In an embodiment, the display module DM may include a display panel DP. The display panel DP may be a light emitting-type display panel, but is not limited thereto. For example, the display panel DP may be an organic light emitting display panel or an inorganic light emitting display panel. An emission layer of an organic light emitting display panel may include an organic light emitting material. An emission layer of the inorganic light emitting display panel may include quantum dots, quantum rods, or the like.

The display module DM may further include an input sensor IS. The input sensor IS may be directly disposed on the display panel DP. The input sensor IS may include sensing electrodes. The input sensor IS may detect external inputs using a self-capacitance method or a mutual-capacitance method. The input sensor IS may detect inputs by an active-type input device.

The input sensor IS may be directly formed on the display panel DP through a continuous process when the display panel DP is manufactured. However, embodiments are not limited thereto, and the input sensor IS may be manufactured as a separate part from the display panel DP, and may be disposed on the display panel DP through an adhesive layer (not shown).

The display module DM may further include an optical layer RCL. The optical layer RCL may reduce reflection of an external light. For example, the optical layer RCL may include a polarizing layer or a color filter layer. However, embodiments are not limited thereto, and the optical layer RCL may include optical members for improving display quality of the display device ED.

In an embodiment, the optical layer RCL may be directly disposed on the input sensor IS. In an embodiment, when the input sensor IS is omitted from the display module DM, the optical layer RCL may be directly disposed on the display panel DP. However, embodiments are not limited thereto, and the optical layer RCL may be disposed on the display panel DP or on the input sensor IS using a separate adhesive member (not shown).

The display module DM may include a folding display portion FP-D and non-folding display portions NFP1-D and NFP2-D. The folding display portion FP-D may be a portion corresponding to the folding region FA1 (see FIG. 1A) of the display device ED, and the non-folding display portions NFP1-D and NFP2-D may be portions respectively corresponding to the non-folding regions NFA1 and NFA2 (see FIG. 1A) of the display device ED.

The folding display portion FP-D may correspond to a portion that is folded or bent with respect to the first folding axis FX1 (see FIGS. 1B and 1C). The display module DM may include a first non-folding display portion NFP1-D and a second non-folding display portion NFP2-D, and the first non-folding display portion NFP1-D and the second non-folding display portion NFP2-D may be spaced apart from each other with the folding display portion FP-D therebetween.

In the display device ED according to an embodiment, the lower module LM may include a support plate MP. In an embodiment, the lower module LM may further include at least one of a support module SM, a protection layer PF, or a buffer layer CPN. For example, the display device ED according to an embodiment may include a support plate MP disposed below a display module DM, a protection layer PF and a buffer layer CPN disposed between the support plate MP and the display module DM, and a support module SM disposed below the support plate MP.

In an embodiment, the support plate MP may be disposed below the display module DM. The support plate MP may include a folding support portion FP-MP and non-folding support portions NFP1-MP and NFP2-MP. The first non-folding support portion NFP1-MP and the second non-folding support portion NFP2-MP of the support plate MP may be spaced apart with the folding support portion FP-MP therebetween. The folding support portion FP-MP may be a portion corresponding to the folding region FA1 (see FIG. 1A) of the display device ED, and the non-folding support portions NFP1-MP and NFP2-MP may be portions respectively corresponding to the non-folding regions NFA1 and NFA2 (see FIG. 1A) of the display device ED.

Referring to FIGS. 3 and 4, a protection layer PF may be disposed between the display module DM and the support plate MP. The protection layer PF may be disposed below the display module DM to protect a rear surface of the display module DM. The protection layer PF may overlap the entire display module DM. The protection layer PF may include a polymer material. For example, the protection layer PF may be a polyimide film or a polyethylene terephthalate film. However, this is only presented as an example, and the material of the protection layer PF is not limited thereto.

The display device ED according to an embodiment may include the support module SM. The support module SM may include a first support portion SPM and a second support portion SAP. The first support portion SPM may be a portion overlapping most of the display module DM. The second support portion SAP may be a portion disposed outside the first support portion SPM and overlapping an outer portion of the display module DM.

The support module SM may include support layers SP1 and SP2. The support layers SP1 and SP2 may include a first sub support layer SP1 and a second sub support layer SP2 that are spaced apart in a direction of the first directional axis DR1. The first sub support layer SP1 and the second sub support layer SP2 may be spaced apart from a portion corresponding to the first folding axis FX1 (see FIGS. 1B and 1C). The support layers SP1 and SP2 are spaced apart from each other from the folding region FA1 to serve as the first sub support layer SP1 and the second sub support layer SP2, thereby improving folding or bending characteristics of the display device ED. Although not shown in the drawings, the support layers SP1 and SP2 may include a cushion layer (not shown) and a lower support plate (not shown) which are stacked in a thickness direction.

The lower support plate (not shown) may include a metal material or a polymer material. For example, the lower support plate (not shown) may include stainless steel, aluminum, copper, or any alloy thereof.

The cushion layer (not shown) may prevent the support plate MP from being pressed and deformed due to external impact and force. The cushion layer (not shown) may include sponge, foam, or an elastomer such as a urethane resin. The cushion layer (not shown) may include at least one of an acryl-based polymer, a urethane-based polymer, a silicone-based polymer, and an imide-based polymer. However, embodiments are not limited thereto. The cushion layer (not shown) may be disposed below the support plate MP or below the lower support plate (not shown).

In an embodiment, the support module SM may further include at least one of a shielding layer EMP or an interlayer adhesive layer ILP. The shielding layer EMP may be an electromagnetic wave shielding layer or a heat dissipation layer. The shielding layer EMP may serve as a bonding layer. The support module SM and the housing HAU may be bonded together using the shielding layer EMP.

The support module SM may further include an interlayer adhesive layer ILP disposed on the support layers SP1 and SP2. The interlayer adhesive layer ILP may bond the support plate MP and the support module SM. The interlayer bonding layer ILP may be provided in the form of a bonding resin layer or an adhesive tape. In an embodiment, a portion of the interlayer adhesive layer ILP which overlaps the folding display portion FP-D may be omitted. However, embodiments are not limited thereto, and the interlayer adhesive layer ILP may overlap the entire folding display portion FP-D.

The second support portion SAP may be disposed outside the support layers SP1 and SP2. The second support portion SAP may be disposed between the support plate MP and the housing HAU. The second support portion SAP may fill a space between the support plate MP and the housing HAU, and may retain the support plate MP in place.

Referring to FIGS. 3 and 4, the display device ED may include the buffer layer CPN in the lower module LM. The buffer layer CPN may serve as a thickness compensation layer below the display module DM or may serve as a support layer for the display module DM. Although not shown in the drawings, in an embodiment, the buffer layer CPN may be omitted.

A combination of components that are included in the lower module LM in the display device ED may vary, depending on the size and shape of the display device ED or on the operation characteristics of the display device ED.

In an embodiment, the display device ED may further include at least one adhesive layer AP1, AP2, or AP3. For example, a first adhesive layer AP1 may be disposed between the display module DM and the protection layer PF, a second adhesive layer AP2 may be disposed between the protection layer PF and the buffer layer CPN, and a third adhesive layer AP3 may be disposed between the support plate MP and the buffer layer CPN. The at least one adhesive layer AP1, AP2, or AP3 may each be an optically clear adhesive film (OCA) or an optically clear adhesive resin layer (OCR). However, embodiments are not limited thereto, and the at least one adhesive layer AP1, AP2, or AP3 may be an adhesive layer having a transmittance of less than or equal to about 80%.

The display device ED may further include a protection film PL disposed above the window WM. The protection film PL may be disposed above the window WM to protect the window WM from an external environment. An adhesive protection layer AP-PL may be further disposed between the window WM and the protection film PL. The adhesive protection layer AP-PL may be an optically clear adhesive layer. When the display device ED includes the protection film PL, the protection film PL may be a layer of the display device ED that is exposed to an external environment.

However, in an embodiment, the protection film PL may be omitted from the display device ED, and the window WM may define an outermost surface of the display device ED. The window WM has excellent mechanical strength and folding properties as well as excellent optical properties that prevent reflection color from being viewed, and accordingly, the protection film PL may be omitted to provide the texture and visual appreciation of glass as they are to a user.

Figure 5:
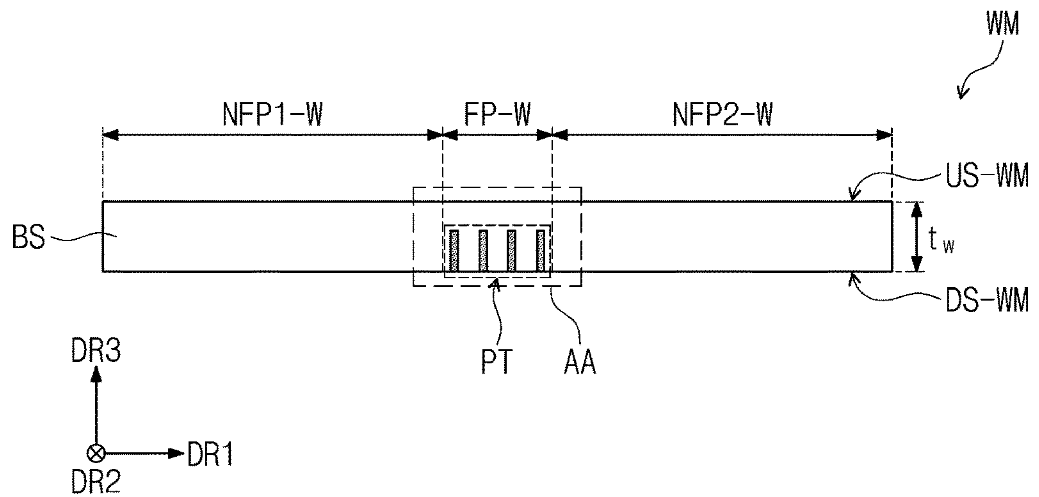
FIG. 5 is a schematic cross-sectional view of a window according to an embodiment.
Figure 6:
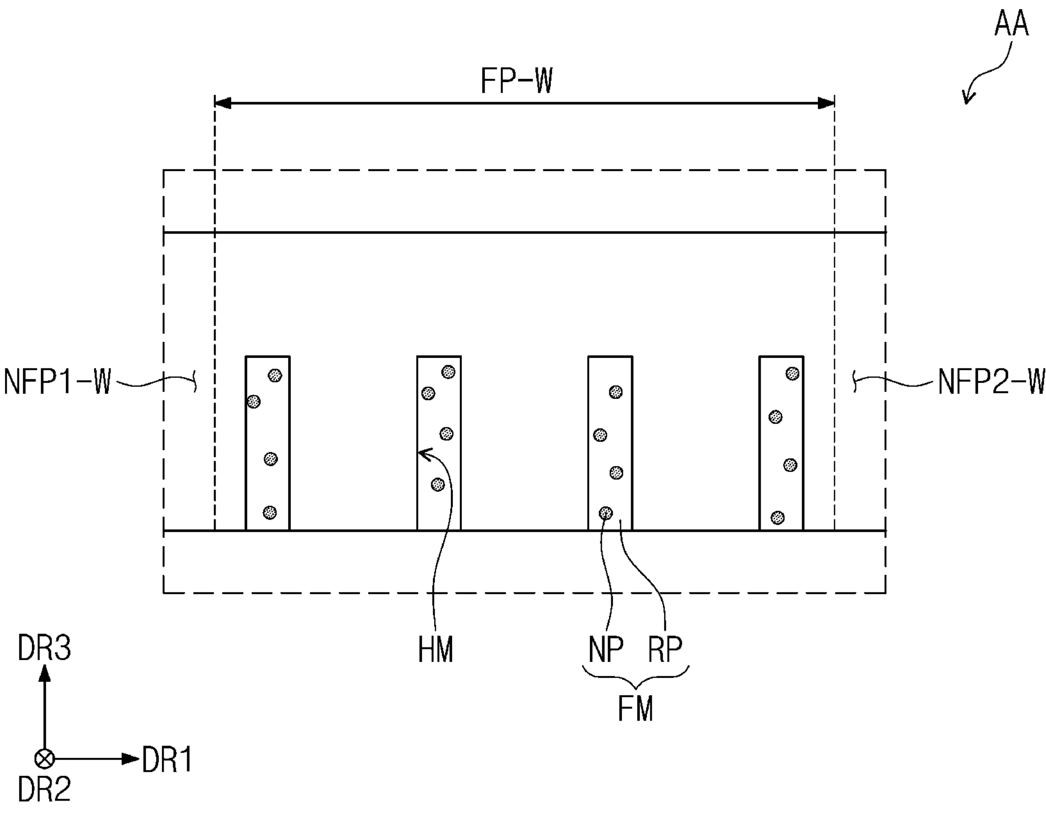
FIG. 6 is a schematic cross-sectional view of a portion of a window according to an embodiment.

FIG. 5 is a schematic cross-sectional view of a window according to an embodiment. FIG. 6 is a schematic cross-sectional view showing a portion of a window according to an embodiment. FIG. 6 may be an enlarged schematic cross-sectional view of portion "AA" in FIG. 5.

Referring to FIGS. 5 and 6, the window WM according to an embodiment may include a base substrate BS including a first surface US-WM and a second surface DS-WM facing each other, and a pattern PT formed on at least one of the first surface US-WM and the second surface DS-WM of the base substrate BS. In the window WM, the pattern PT may include a concave portion HM defined on at least one of the first surface US-WM and the second surface DS-WM, and a filling portion FM that fills the concave portion HM.

In an embodiment, the first surface US-WM of the base substrate BS may be referred to as an upper surface, and the second surface DS-WM of the base substrate BS may be referred to as a lower surface. The first surface US-WM of the base substrate BS may serve as a first surface or as an upper surface of the window WM, and the second surface DS-WM of the base substrate BS may serve as a second surface or as a lower surface of the window WM. The second surface DS-WM of the base substrate BS may be a surface that is adjacent to the display module DM (see FIG. 4).

In an embodiment, the base substrate BS may be a substrate made of glass. For example, the window WM may be a cover window made of glass. The base substrate BS may be a glass substrate. For example, the base substrate BS may be a tempered glass substrate.

In an embodiment, the base substrate BS may include a folding portion FP-W and non-folding portions NFP1-W and NFP2-W, and the folding portion FP-W of the base substrate BS may be referred to as a folding portion FP-W of a window, and the non-folding portions NFP1-W and NFP2-W of the base substrate BS may be referred to as non-folding portions NFP1-W and NFP2-W of a window.

In an embodiment, the window WM may have a thickness $t_W$ greater than or equal to about 100 μm. For example, the window may have a thickness $t_W$ in a range of about 100 μm to about 500 μm. The window WM is relatively thicker than UTG (ultra-thin glass) and the like, and may exhibit excellent impact resistance. The thickness $t_W$ of the window WM may correspond to a thickness of a portion of the base substrate BS in which the concave portion HM is not defined. For example, in an embodiment, the window WM a thickness of the portion of the base substrate BS in which the concave portion HM is not defined may be greater than or equal to about 100 μm.

In an embodiment, the concave portion HM may be defined in the folding portion FP-W. For example, the pattern PT including the filling portion FM may be formed in the folding portion FP-W that is folded with respect to virtual folding axes FX1 and FX2 (see FIGS. 1A and 2A). In FIGS. 5 and 6, the filling portion FM is shown to have a rectangular cross-section on a plane defined by the first and third directional axes DR1 and DR3. However, embodiments are not limited thereto, and this is only an example of a cross-sectional shape of the filling portion FM, and the cross-sectional shape of the filling portion FM or of the concave portion HM is not limited to what is shown in the drawings. For example, the concave portion HM may be defined by at least one curved surface or slanted surface, and some of the concave portions HM forming the pattern PT may be defined to be different in shape and size from the others. Accordingly, the shape of the filling portion FM filling the concave portion HM may be variously formed and changed.

In an embodiment, a difference between a refractive index of the base substrate BS and a refractive index of the filling portion FM may be less than or equal to about 0.02, and a difference between an Abbe No. of the base substrate BS and an Abbe No. of the filling portion FM may be less than or equal to about 5.0. For example, a difference between a refractive index of the base substrate BS and a refractive index of the filling portion FM may be less than or equal to about 0.005, and a difference between an Abbe No. of the base substrate BS and an Abbe No. of the filling portion FM may be less than or equal to about 5.0.

In an embodiment, the filling portion FM may have a refractive index in a range of about 1.49 to about 1.51, and may have an Abbe No. in a range of about 45 to about 50. In an embodiment, the base substrate BS may be made of glass, and for example, the base substrate BS may have a refractive index in a range of about 1.48 to about 1.52, and may have an Abbe No. in a range of about 49 to about 52.

In the specification, the refractive indices of the base substrate BS and the filling portion FM may each be a refractive index value at a wavelength of about 589 nm, and the Abbe Nos. of the base substrate BS and the filling portion FM may each be a value calculated through Equation 1:

$$\text{Abbe No.}=(n_D-1)/(n_F-n_C) \quad \text{[Equation 1]}$$

In Equation 1, $n_D$ is a refractive index at a wavelength of about 589 nm, $n_F$ is a refractive index at a wavelength of about 486 nm, and $n_C$ is a refractive index at a wavelength of about 656 nm.

In an embodiment, the filling portion FM has both a refractive index in a range of about 1.49 to about 1.51, and an Abbe No. in a range of about 45 to about 50 to minimize a difference in optical properties from the adjacent base substrate BS, and accordingly, in the window WM according to an embodiment, the visual perception of the pattern PT according to a difference in optical properties between the filling portion FM and the base substrate BS may be minimized, and visual perception of reflection color in which a specific color is viewed by external light may be reduced.

In an embodiment, the filling portion FM may include nanoparticles NP and an acrylic polymer resin RP. The nanoparticles NP may include at least one of $Al_2O_3$ and glass particles. In an embodiment, the filling portion FM may include, as nanoparticles NP, $Al_2O_3$, glass particles, or a combination thereof. Even when only nanoparticles NP of the same material are included, such as when the nanoparticles NP included in the filling portion FM include only $Al_2O_3$ or only glass particles an average particle size of the nanoparticles NP may be different. For example, the nanoparticles NP having different average particle sizes may be included in the filling portion FM.

In an embodiment, the nanoparticles NP included in the filling portion FM may be particles having a spherical shape, an elliptical shape, or an atypical shape. The nanoparticles NP may be particles having an average particle size less than or equal to about 100 nm. For example, the nanoparticles NP may have an average particle size in a range of about 10 nm to about 70 nm. In an embodiment, degradation in optical properties such as a decrease in light transmittance or an increase in haze due to the nanoparticles NP may be minimized by setting the average particle size of the nanoparticles NP included in the filling portion FM to less than or equal to about 100 nm.

In an embodiment, the nanoparticles NP may have a refractive index of greater than or equal to about 1.5 at a wavelength of about 589 nm. For example, the nanoparticles NP may have a refractive index in a range of about 1.5 to about 1.8 at a wavelength of about 589 nm. The nanoparticles NP may have an Abbe No. of greater than or equal to about 60. For example, the nanoparticles NP may have an Abbe No. in a range of about 60 to about 80. In an embodiment, the filling portion FM includes the nanoparticles NP having a refractive index greater than or equal to about 1.5 at a wavelength of about 589 nm and an Abbe No. greater than or equal to about 60, and may thus exhibit properties similar to those of the base substrate BS. In an embodiment, the filling portion FM includes an acrylic polymer resin RP, and nanoparticles NP having a refractive index greater than or equal to about 1.5 and an Abbe No. greater than or equal to about 60 to have a minimized difference in refractive index and Abbe No. from the base substrate BS, and may thus exhibit excellent optical properties that prevent the pattern PT of the filling portion FM from being viewed and the reflected color from being observed in the window WM.

In an embodiment, the filling portion FM may include an acrylic polymer resin RP, and the nanoparticles NP may be dispersed in the acrylic polymer resin RP.

In the filling portion FM, the acrylic polymer resin RP may be formed from a base resin including two or more types of acrylic monomers that are different from each other. In an embodiment, the acrylic polymer resin RP forming the filling portion FM may be formed through a polymerization reaction of two or more types of acrylic monomers that are different from each other. In an embodiment, the filling portion FM may be formed through a polymerization reaction of a resin composition that includes a base resin including two or more types of acrylic monomers that are different from each other, a crosslinking agent, a photoinitiator, and the nanoparticles NP.

The acrylic polymer resin RP of the filling portion FM may be formed through a polymerization reaction of the base resin included in the resin composition. The polymerization reaction in the resin composition may be performed through photopolymerization. In the polymerization reaction, a thermal polymerization process may be further performed, in addition to the photopolymerization.

In an embodiment, the base resin may include two or more types of acrylic monomers that are different from each other, and may include one or more types of acrylic monomers represented by Formula 1, among the above-described acrylic monomers.

[Formula 1]

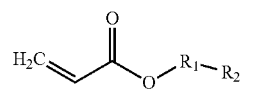

In Formula 1, $R_1$ may be O (oxygen), a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms; and $R_2$ may be a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms. In Formula 1, at least one of $R_1$ and $R_2$ may include a substituted or unsubstituted aryl group having 6 to 18 carbon atoms.

In the specification, the term "substituted or unsubstituted" may describe a group that is substituted or unsubstituted with at least one substituent selected from the group consisting of a deuterium atom, a halogen atom, a cyano group, a nitro group, an amine group, a silyl group, an oxy group, a thio group, a sulfinyl group, a sulfonyl group, a carbonyl group, a boron group, a phosphine oxide group, a phosphine sulfide group, an alkyl group, an alkenyl group, an alkynyl group, an alkoxy group, a hydrocarbon ring group, an aryl group, and a heterocyclic group. Each of the substituents listed above may itself be substituted or unsubstituted. For example, a biphenyl group may be interpreted as an aryl group, or it may be interpreted as a phenyl group substituted with a phenyl group.

In the specification, an alkyl group may be linear, branched, or cyclic. Examples of an alkyl group may include a methyl group, an ethyl group, an n-propyl group, an isopropyl group, an n-butyl group, a s-butyl group, a t-butyl group, an i-butyl group, a 2-ethylbutyl group, a 3,3-a dimethylbutyl group, an n-pentyl group, an i-pentyl group, a neopentyl group, a t-pentyl group, a cyclopentyl group, a 1-methylpentyl group, a 3-methylpentyl group, a 2-ethylpentyl group, a 4-methyl-2-pentyl group, an n-hexyl group, a 1-methylhexyl group, a 2-ethylhexyl group, a 2-butylhexyl group, a cyclohexyl group, a 4-methylcyclohexyl group, a 4-t-butylcyclohexyl group, an n-heptyl group, a 1-methylheptyl group, a 2,2-dimethylheptyl group, a 2-ethylheptyl group, a 2-butylheptyl group, an n-octyl group, a t-octyl group, a 2-ethyloctyl group, a 2-butyloctyl group, a 2-hexyloctyl group, a 3,7-dimethyloctyl group, a cyclooctyl group, an n-nonyl group, an n-decyl group, an adamantyl group, a 2-ethyldecyl group, a 2-butyldecyl group, a 2-hexyldecyl group, a 2-octyldecyl group, an n-undecyl group, an n-dodecyl group, a 2-ethyldodecyl group, a 2-butyldodecyl group, a 2-hexyldocecyl group, a 2-octyldodecyl group, an n-tridecyl group, an n-tetradecyl group, an n-pentadecyl group, an n-hexadecyl group, a 2-ethylhexadecyl group, a 2-butylhexadecyl group, a 2-hexylhexadecyl group, a 2-octylhexadecyl group, an n-heptadecyl group, an n-octadecyl group, an n-nonadecyl group, an n-eicosyl group, a 2-ethyleicosyl group, a 2-butyleicosyl group, a 2-hexyleicosyl group, a 2-octyleicosyl group, an n-henicosyl group, an n-docosyl group, an n-tricosyl group, an n-tetracosyl group, an n-pentacosyl group, an n-hexacosyl group, an n-heptacosyl group, an n-octacosyl group, an n-nonacosyl group, an n-triacontyl group, and the like, but are not limited thereto.

In the specification, an aryl group may be any functional group or substituent derived from an aromatic hydrocarbon ring. An aryl group may be monocyclic or polycyclic. Examples of an aryl group may include a phenyl group, a naphthyl group, a fluorenyl group, an anthracenyl group, a phenanthryl group, a biphenyl group, a terphenyl group, a quaterphenyl group, a quinquephenyl group, a sexiphenyl group, a triphenylenyl group, a pyrenyl group, a benzofluoranthenyl group, a chrysenyl group, and the like, but are not limited thereto.

In an embodiment, the acrylic monomer represented by Formula 1 may include at least one aromatic linker or aromatic substituent in a monomer unit. For example, in an embodiment, the acrylic monomer represented by Formula 1 above may include a substituted or unsubstituted phenyl group in a linker represented by $R_1$ or in a substituent represented by $R_2$. For example, the acrylic monomer represented by Formula 1 may include a substituted or unsubstituted monovalent or divalent phenyl group. For example, the acrylic monomer represented by Formula 1 may include an unsubstituted monovalent or divalent phenyl group or a hydroxy group-substituted phenyl group.

In an embodiment, when the acrylic polymer resin RP is formed from a base resin containing at least one acrylic monomer having an aromatic moiety (for example, an aryl group), the filling portion FM may exhibit a relatively high refractive index value compared to a case in which the acrylic polymer resin RP is formed from a base resin containing only an acrylic monomer without an aryl group. Therefore, in the window WM according to an embodiment, the filling portion FM has a high refractive index value to match a refractive index of the base substrate BS, and may thus exhibit reduced visual perception of the pattern PT formed in the folding portion FP-W.

In an embodiment, the base resin may include two or more types of acrylic monomers selected from 2-ethylhexyl acrylate (2-EHA), benzyl acrylate (BZA), 2-phenoxyethyl acrylate (2-PEA), ethyl acrylate (EA), hexyl acrylate (HA), and 4-hydroxybutyl acrylate (4-HBA). For example, the base resin may essentially include at least one of benzyl acrylate (BZA) or 2-phenoxyethyl acrylate (2-PEA), and may include at least one of the other acrylic monomers.

In an embodiment, an amount of one or more types of acrylic monomers represented by Formula 1 in base resin may be in a range of about 10 wt % to about 40 wt %, with respect to 100 wt % of the base resin. For example, in an embodiment, the base resin forming the filling portion FM of the window WM includes an acrylic monomer, which includes at least one aromatic linker or aromatic substituent, in an amount that is in a range of about 10 wt % to about 40 wt %. with respect to 100 wt % of the base resin, may thus have a higher refractive index value than a base resin that includes only an acrylic monomer without an aromatic linker or an aromatic substituent. Accordingly, in the window WM according to an embodiment, the filling portion FM exhibits an optical properties in which a refractive index is matched with that of the base substrate BS at a specific wavelength, and accordingly, the filling portion FM may not be visually perceived.

The resin composition may include at least one crosslinking agent, at least one photoinitiator, and the nanoparticles NP, in addition to the above-described base resin. An amount of the crosslinking agent in the resin composition may be in a range of about 10 wt % to about 20 wt %, with respect to 100 wt % of the base resin. When the amount of the crosslinking agent in the resin composition is less than about 10 wt %, the base resin has reduced hardness and the filling portion FM may thus not obtain sufficient strength, and when the amount of the crosslinking agent in the resin composition is greater than about 20 wt %, the filling portion FM may not have sufficient flexibility, leading to degradation of the folding properties of the window WM.

In an embodiment, the resin composition may include at least one of 1,6-hexanediol diacrylate (HDDA) or ethylene glycol diacrylate (EGDA) as a crosslinking agent, and may include bis(2,4,6-trimethylbenzoyl)-phenylphoshphineoxide as a photoinitiator. However, the types of crosslinking agent and photoinitiator included in the resin composition are not limited to those described above, and any type that may contribute to polymerization and crosslinking reactions of an acrylate group may be used without limitation.

An amount of the nanoparticles NP in the resin composition may be in range of about 0.1 wt % to about 10 wt %, with respect to 100 wt % of the base resin. The nanoparticles NP may be inorganic particles having a higher refractive index and a higher Abbe No. than the base resin including an acrylic monomer. The resin composition includes the nanoparticles NP having a higher Abbe No. than the base resin, so that the filling portion FM formed from the resin composition may thus have an Abbe No. that is similar to that of the base substrate BS made of glass.

In the resin composition, when the nanoparticles NP are included in an amount of less than about 0.1 wt % with respect to 100 wt % of the base resin, the filling portion FM may not be able to exhibit a sufficiently high Abbe No., and in the resin composition, when the nanoparticles NP are included in an amount greater than about 10 wt % with respect to 100 wt % of the base resin, the filling portion FM may have reduced light transmittance or increased haze due to the nanoparticles NP, resulting in degradation of the optical properties of the window WM.

The filling portion FM formed from the resin composition of an embodiment including the base resin including an acrylic monomer represented by Formula 1, at least one crosslinking agent, at least one photoinitiator, and the nanoparticles NP may exhibit properties such as a refractive index in a range of about 1.48 to about 1.51, and an Abbe No. in a range of about 45 to about 50. The filling portion FM formed from the resin composition may have a refractive index that differs from a refractive index of the base substrate BS by less than or equal to about 0.02, and an Abbe No. that differs from an Abbe No. of the base substrate BS by less than or equal to about 5.0. Accordingly, the window WM according to an embodiment including the filling portion FM formed from the resin composition according to an embodiment may have excellent optical properties that prevent the pattern PT of the filling portion FM from being viewed and the reflection color from being observed.

The filling portion FM formed from the resin composition according to an embodiment has a glass transition temperature Tg that is less than or equal to about −20° C. to have flexibility even at a low temperature, and accordingly, excellent low-temperature folding properties may be maintained. The filling portion FM formed from the resin composition according to an embodiment has an elongation of greater than or equal to about 200%, and maintains adhesion to a glass substrate at least as high as about 1,000 gf/inch, and may thus exhibit excellent mechanical properties. Therefore, the window WM having the filling portion FM formed from the resin composition according to an embodiment may maintain folding properties and excellent mechanical strength, and may also exhibit excellent optical quality without viewability degradation due to the filling portion FM.

Figure 7A:
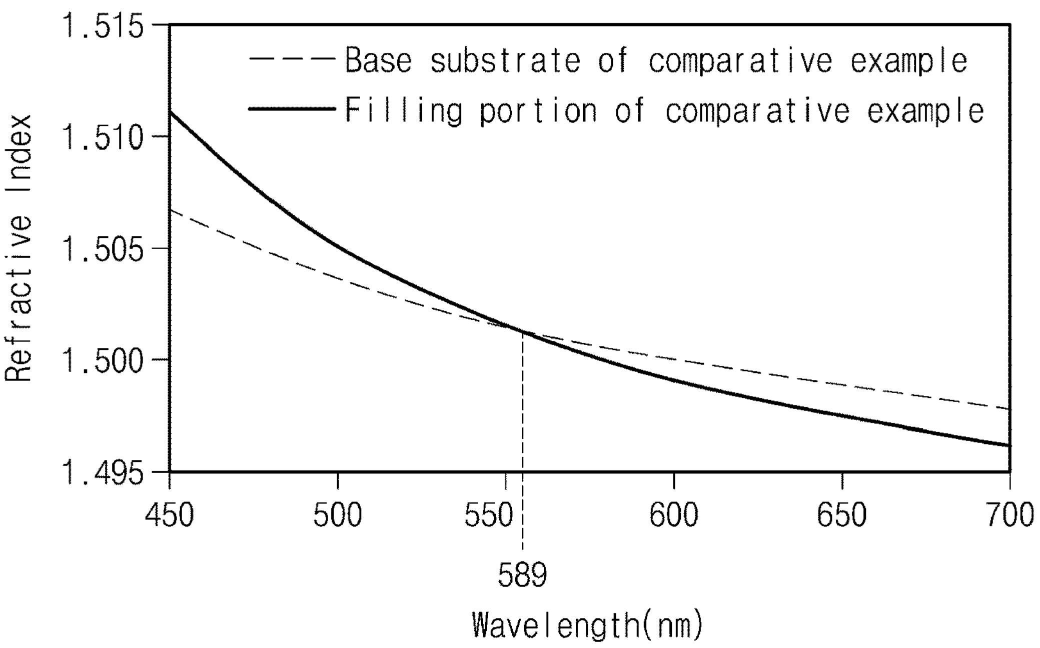
FIG. 7A is a graph showing refractive index characteristics of a base substrate and a filling portion in the Comparative Examples.
Figure 7B:
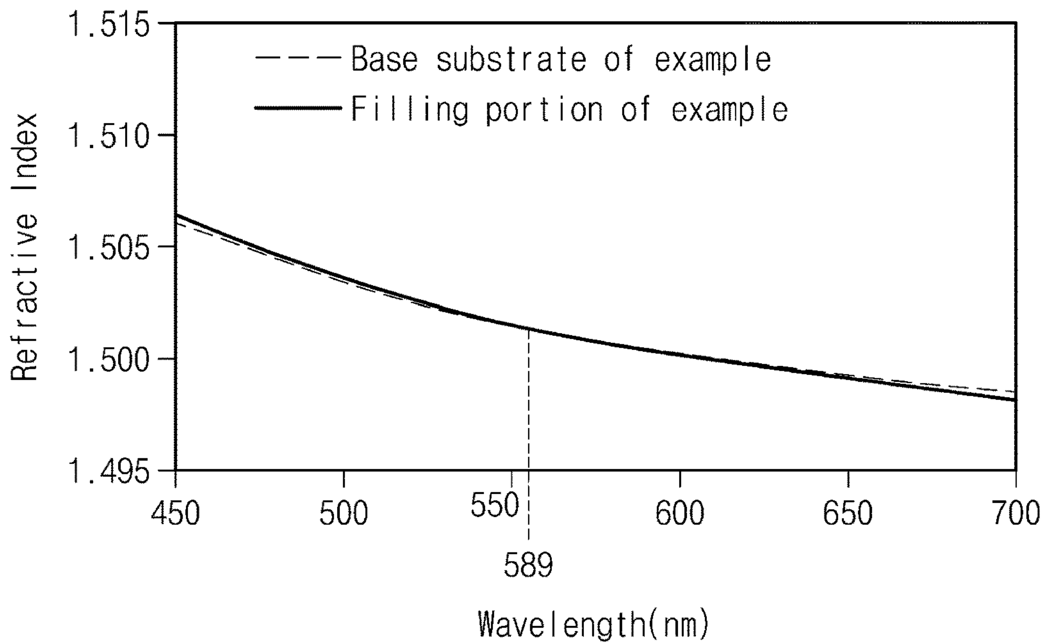
FIG. 7B is a graph showing refractive index characteristics of a base substrate and a filling portion in the Examples.

FIGS. 7A and 7B are graphs showing refractive index characteristics across a range of wavelengths. FIG. 7A shows refractive index characteristics of a base substrate and a filling portion in the Comparative Examples, and FIG. 7B shows refractive index characteristics of a base substrate and a filling portion in the Examples.

In FIG. 7A, the base substrate of a Comparative Example is a glass substrate, and the filling portion of the Comparative Example corresponds to a filling portion that does not include nanoparticles and includes an acrylic polymer resin alone. Referring to FIG. 7A, it is seen that the refractive index of the base substrate matches the refractive index of the filling portion at 589 nm, but there is a difference in refractive index between the base substrate and the filling portion at other wavelengths. Accordingly, when external light having a wavelength other than 589 nm is incident, reflection color due to the difference in refractive index between the filling portion and the base substrate may be viewed.

In FIG. 7B, the base substrate of an Example is a glass substrate and the filling portion of the Example corresponds to a filling portion including nanoparticles and an acrylic polymer resin. The nanoparticles included in the filling portion of the Example in FIG. 7B correspond to glass particles. Referring to FIG. 7B, in the case of the Example, it is seen that the refractive indices of the base substrate and the filling portion are identical or substantially identical throughout most of the wavelength range between about 450 nm to about 700 nm other than 589 nm. For example, the window according to an embodiment has similar refractive indices of the base substrate and the filling portion through most of the visible light spectrum, and accordingly, reflection color may not be viewed even when wavelengths other than 589 nm are incident as external light.

Figure 8:
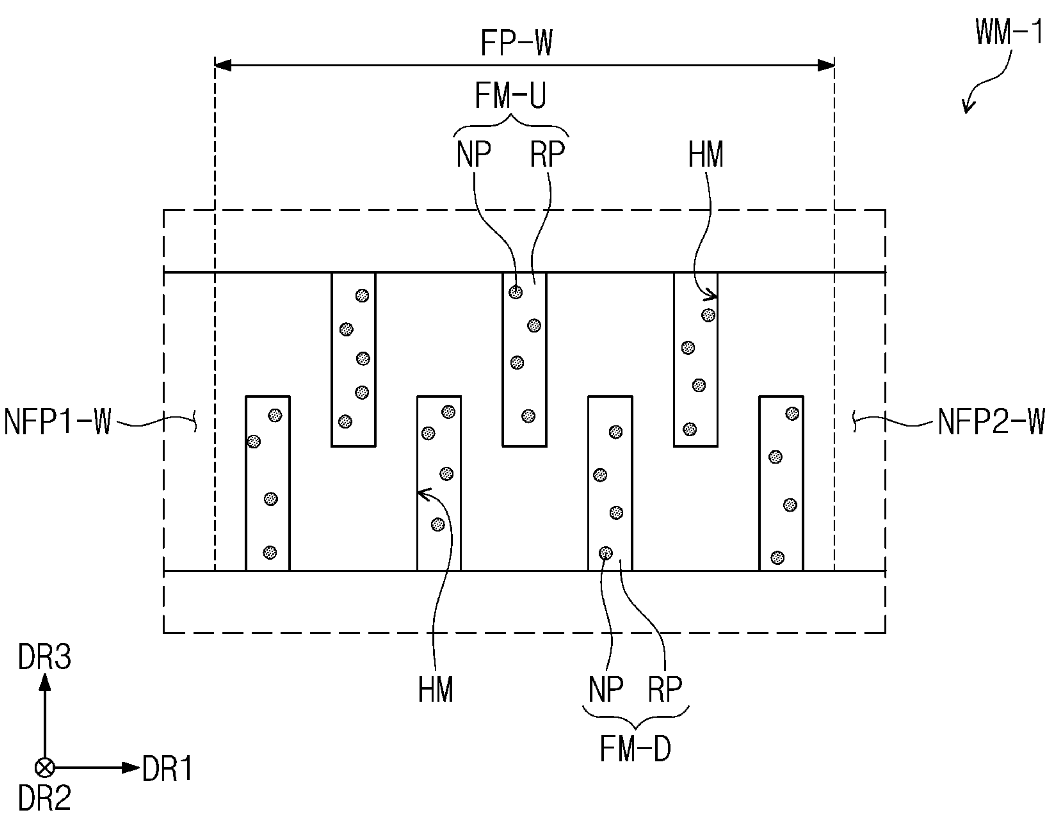
FIG. 8 is a schematic cross-sectional view of a portion of a window according to an embodiment.
Figure 9A:
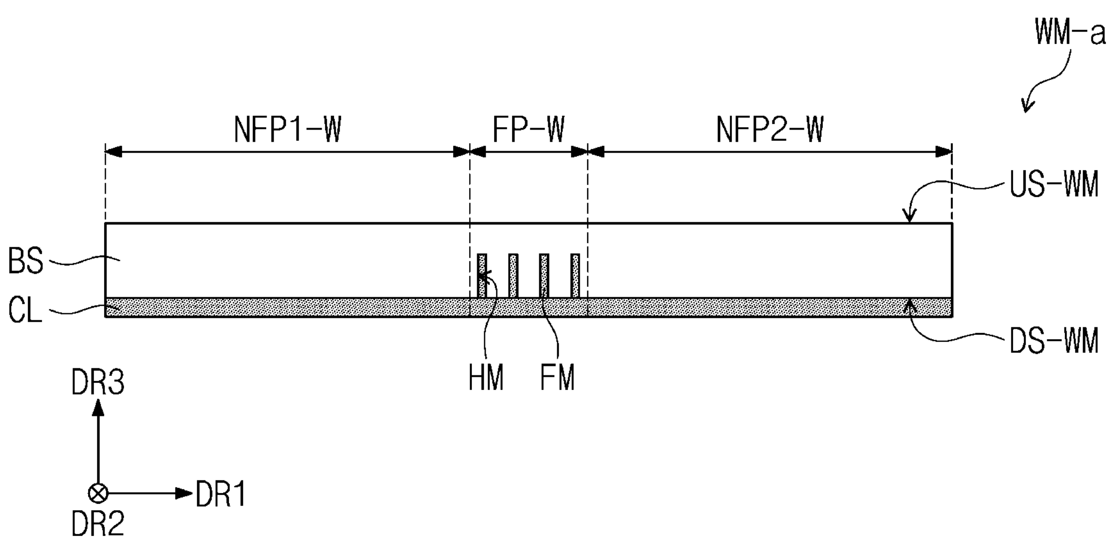
FIG. 9A is a schematic cross-sectional view of a window according to an embodiment.
Figure 9B:
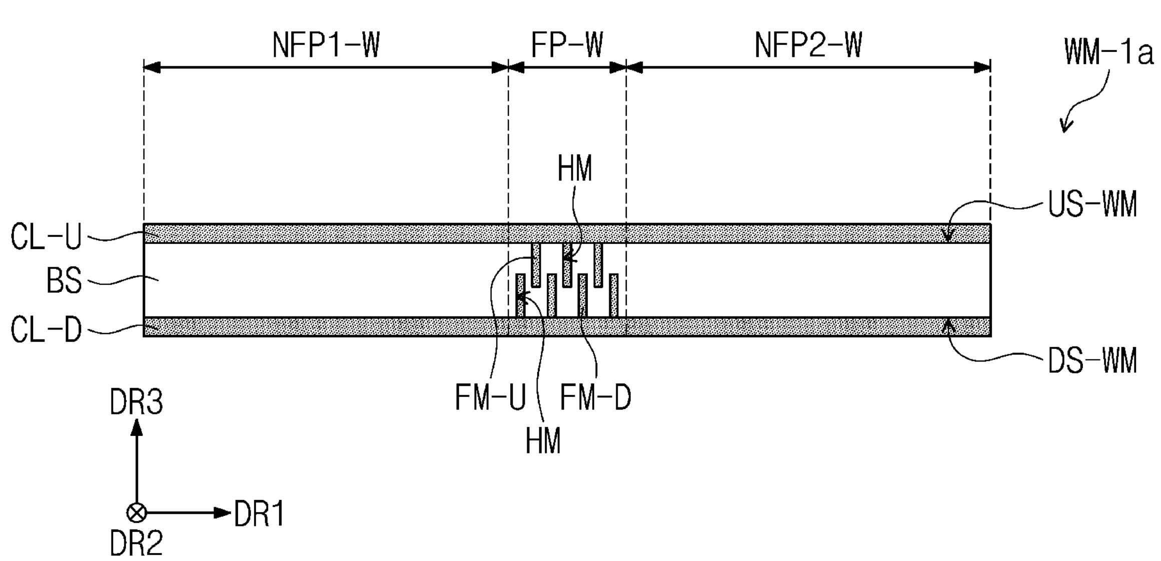
FIG. 9B is a schematic cross-sectional view of a window according to an embodiment.

FIGS. 8 to 9B are cross-sectional views of windows according to an embodiment. In describing a window according to an embodiment with reference to FIGS. 8 and 9B, the features which have been described above with respect to FIGS. 1 to 7B will not be explained again, and the differing features will be described.

FIG. 8 is a schematic cross-sectional view of a window according to an embodiment. FIG. 8 may show a portion of a window corresponding to region “AA” of FIG. 5.

According to an embodiment shown in FIG. 8, a window WM-1 may include a folding portion FP-W, and a first non-folding portion NFP1-W and a second non-folding portion NFP2 disposed at either side of the folding portion FP-W with the folding portion FP-W therebetween. Referring to FIG. 8, the window WM-1 according to an embodiment may include concave portions HM defined on both the upper surface and the lower surface of the window WM-1, and filling portions FM-U and FM-D filling the concave portions HM.

The window WM-1 according to an embodiment may include an upper filling portion FM-U filling the concave portions HM defined on the first surface US-WM (see FIG. 5) of the base substrate, and a lower filling portion FM-D filling the concave portions HM defined on the second surface DS-WM (see FIG. 5) of the base substrate. The upper filling portion FM-U and the lower filling portion FM-D may be disposed in the folding portion FP-W.

The upper filling portion FM-U and the lower filling portion FM-D may each include an acrylic polymer resin RP and nanoparticles NP. The upper filling portion FM-U and the lower filling portion FM-D may each include an acrylic polymer resin RP formed from a base resin including an acrylic monomer represented by Formula 1 as described above, and nanoparticles NP that include at least one of $Al_2O_3$ and glass particles. The upper filling portion FM-U and the lower filling portion FM-D may each have a refractive index that differs from a refractive index of the other portions of the base substrate BS in which the concave portions HM are not defined by less than or equal to about 0.02 and may each have an Abbe No. that differs from an Abbe No. of the other portions of the base substrate BS in which the concave portions HM are not defined by less than or equal to about 5.0. The upper filling portion FM-U and the lower filling portion FM-D may each independently have a refractive index in a range of about 1.49 to about 1.51 at a wavelength of about 589 nm, and may each independently have an Abbe No. in a range of about 45 to about 50. The upper filling portion FM-U and the lower filling portion FM-D may each independently have a glass transition temperature less than or equal to about −20° C., and may each independently have an elongation greater than or equal to about 200%.

The window WM-1 includes the filling portions FM-U and FM-D filled in the concave portions HM defined in the folding portion FP-W and containing an acrylic polymer resin RP and nanoparticles NP formed from the resin composition according to an embodiment described above, and may thus exhibit excellent impact resistance and folding properties, as well as excellent optical properties that prevent the filling portions FM-U and FM-D, and reflection color from being visually perceived.

FIGS. 9A and 9B are each a schematic cross-sectional view of a window according to an embodiment. Referring to FIGS. 9A and 9B, windows WM-a and WM-1*a* according to embodiments may further include cover layers CL, CL-U, and CL-D each disposed on a surface US-WM or DS-WM of the base substrate BS in which the concave portions HM are defined.

In an embodiment shown in FIG. 9A, the window WM-a may include abase substrate BS and a filling portion FM filled in concave portions HM defined on the lower surface DS-WM of the base substrate BS. The filling portion FM may be disposed in the concave portions HM defined in the folding portion FP-W. In an embodiment, the window WM-a may include a cover layer CL disposed on the lower surface DS-WM of the base substrate BS in which the concave portions HM are defined.

The cover layer CL may be disposed adjacent to the filling portion FM. The cover layer CL may include a same material as the filling portion FM. The cover layer CL may be formed by including an acrylic polymer resin and nanoparticles which form the filling portion FM. The cover layer CL may be formed as a single body with the filling portion FM. The cover layer CL may be formed in a same process as the process of forming the filling portion FM filling the concave portions HM.

In an embodiment, the cover layer CL may have an adhesion strength. When the cover layer CL has an adhesion strength, the window adhesive layer AP-W (see FIG. 4) may be omitted.

The filling portion FM and the cover layer CL may each include the acrylic polymer resin RP (see FIG. 6) and the nanoparticles NP (see FIG. 6). The filling portion FM and the cover layer CL may each include the acrylic polymer resin RP (see FIG. 6) formed from a base resin including an acrylic monomer represented by Formula 1 as described above, and the nanoparticles NP (see FIG. 6) that include at least one of $Al_2O_3$ and glass particles.

The filling portion FM may have a refractive index that differs from a refractive index of the other portions of the base substrate BS in which the concave portions HM are not defined by less than or equal to about 0.02, and may have an Abbe No. that differs from an Abbe No. of the other portions of the base substrate BS in which the concave portions HM are not defined by less than or equal to about 5.0. The filling portion FM may have a refractive index in a range of about 1.49 to about 1.51 at a wavelength of about 589 nm, and have an Abbe No. in a range of about 45 to about 50. The filling portion FM and the cover layer CL may each have a glass transition temperature of less than or equal to about −20° C., and may each have an elongation of greater than or equal to about 200%. Accordingly, the window WM-a according to an embodiment may exhibit excellent impact resistance and folding properties, as well as excellent optical properties that prevent the filling portion FM and reflection color from being visually perceived.

In an embodiment shown in FIG. 9B, the window WM-1*a* may include a base substrate BS and filling portions FM-U and FM-D filled in concave portions HM respectively defined on the upper surface US-WM and the lower surface DS-WM of the base substrate BS. The upper filling portion FM-U may be disposed in the concave portions HM defined in the folding portion FP-W on the upper surface US-WM of the base substrate BS, and the lower filling portion FM-D may be disposed in the concave portions HM defined in the folding portion FP-W on the lower surface DS-WM of the base substrate BS. The window WM-1*a* may include an upper cover layer CL-U disposed on the upper surface US-WM of the base substrate BS in which the concave portions HM are defined, and a lower cover layer CL-D disposed on the lower surface DS-WM of the base substrate BS in which the concave portions HM are also defined.

The upper cover layer CL-U may be disposed adjacent to the upper filling portion FM-U, and the lower cover layer CL-D may be disposed adjacent to the lower filling portion FM-D. The cover layers CL-U and CL-D may each include a same material as the filling portions FM-U and FM-D. The cover layers CL-U and CL-D may be formed by including an acrylic polymer resin and nanoparticles which form the filling portions FM-U and FM-D. The cover layers CL-U and CL-D may be formed as a single body with the filling portions FM-U and FM-D. The cover layers CL-U and CL-D may be formed in a same process as the process of forming the filling portions FM-U and FM-D filling the concave portions HM.

In an embodiment, at least one of the upper cover layer CL-U and the lower cover layer CL-D may have an adhesion strength. When the upper cover layer CL-U has an adhesion strength, the adhesive protection layer AP-PL (see FIG. 4) may be omitted, and when the lower cover layer CL-D has an adhesion strength, the window adhesive layer AP-W (see FIG. 4) may be omitted.

The upper filling portion FM-U, the lower filling portion FM-D, the upper cover layer CL-U, and the lower cover layer CL-D may each include the acrylic polymer resin RP (see FIG. 6) and the nanoparticles NP (see FIG. 6). The upper filling portion FM-U, the lower filling portion FM-D, the upper cover layer CL-U, and the lower cover layer CL-D may each include the acrylic polymer resin RP (see FIG. 6) formed from a base resin including an acrylic monomer represented by Formula 1 as described above, and the nanoparticles NP (see FIG. 6) that include at least one of $Al_2O_3$ and glass particles.

The upper filling portion FM-U and the lower filling portion FM-D may each have a refractive index that differs from a refractive index of the other portions of the base substrate BS in which the concave portions HM are not defined by less than or equal to about 0.02, and may each have an Abbe No. that differs from an Abbe No. of the other portions of the base substrate BS in which the concave portions HM are not defined by less than or equal to about 5.0. The upper filling portion FM-U and the lower filling portion FM-D may each have a refractive index in a range of about 1.49 to about 1.51 at a wavelength of about 589 nm, and may each have an Abbe No. in a range of about 45 to about 50. The upper filling portion FM-U, the lower filling portion FM-D, the upper cover layer CL-U, and the lower cover layer CL-D may each have a glass transition temperature of less than or equal to about −20° C., and may each have an elongation of greater than or equal to about 200%. Accordingly, the window WM-1*a* according to an embodiment may exhibit excellent impact resistance and folding properties, as well as excellent optical properties that prevent the filling portions FM-U and FM-D, and reflection color from being visually perceived.

Referring to FIGS. 1A to 4, the display devices ED and ED-a described above may include, as a cover window, a window WM according to an embodiment shown in FIGS. 5 and 6, or may include, as a cover window, one of windows WM-1, WM-a, and WM-1*a* according to an embodiment described with reference to FIGS. 8 to 9B.

Hereinafter, a window according to an embodiment and a display device including the same will be described in detail with reference to the Examples and the Comparative Examples. However, the Examples and the Comparative Examples described below are presented only as examples to assist in understanding the disclosure and the scope thereof is not limited to the Examples and the Comparative Examples.

Table 1 shows the characteristics of nanoparticles included in a resin composition used in the Examples, and Table 2 shows a composition ratio of resin compositions in the Examples and the Comparative Examples. Table 3 shows the evaluation results of the Examples and the Comparative Examples.

TABLE 1

| Item | Type of nanoparticle | Particle size distribution (D90) (nm) | Refractive index (@589 nm) | Abbe No. |
|---|---|---|---|---|
| NP1 | $Al_2O_3$ | 20 | 1.768 | 72.3 |
| NP2 | Glass particle | 50 | 1.511 | 61 |
| NP3 | Glass particle | 50 | 1.504 | 63 |

Table 1 shows a particle size distribution, a refractive index at 589 nm, and an Abbe No. among the physical properties of the nanoparticles included in the resin composition shown in Table 2 below. The particle size distribution shown in Table 1 corresponds to a particle size distribution at D90. Table 2 below shows the composition of the resin compositions of Comparative Examples 1 to 5 without nanoparticles and the composition of the resin compositions of Examples 1 to 7 including nanoparticles An amount of each material in Table 2 was provided with respect to wt % and with respect to an amount of a base resin, which is a total amount of acrylic monomers as 100 wt %, and with respect to 100 wt % of the base resin, an amount of a crosslinking agent, a photoinitiator, and nanoparticles were each provided as a relative amount of wt %.

The type of acrylic monomers and the type of crosslinking agents used in Comparative Examples 1 to 5 and Examples 1 to 7 are as shown in Table 2, and the photoinitiator used in Comparative Examples and Examples was bis(2,4,6-trimethylbenzoyl)-phenylphosphineoxide In Examples 1 and 2, NP1 in Table 1 was used as nanoparticles, in Examples 3 and 4, NP2 in Table 1 was used as nanoparticles, and in Examples 5 to 7, NP3 in Table 1 was used as nanoparticles.

TABLE 2

| | Acrylic monomer (wt %) | | | | | Crosslinking agent (wt %) | | Photoinitiator | Nanoparticle |
|---|---|---|---|---|---|---|---|---|---|
| Item | 2-EHA | HA | 4-HBA | BZA | 2-PEA | HDDA | EGDA | (wt %) | (wt %) |
| Comparative Example 1 | 45 | — | 35 | 5 | 15 | 10 | — | 1 | — |
| Comparative Example 2 | 40 | 25 | — | — | 35 | — | 10 | | — |
| Comparative Example 3 | 35 | — | 15 | 25 | — | 20 | — | | — |
| Comparative Example 4 | 35 | 15 | 10 | — | 40 | — | 10 | | — |
| Comparative Example 5 | 40 | 10 | 10 | 5 | 35 | 10 | — | | — |
| Example 1 | 45 | — | 35 | 5 | 15 | 10 | — | | 1 |
| Example 2 | 45 | 10 | 35 | — | 10 | 10 | — | | 2 |
| Example 3 | 40 | 20 | — | 10 | 30 | — | 10 | | 0.5 |
| Example 4 | 40 | 15 | — | — | 40 | — | 10 | | 1 |
| Example 5 | 35 | 15 | 10 | — | 40 | — | 10 | | 0.5 |
| Example 6 | 35 | 15 | 10 | 15 | 25 | 15 | — | | 1 |
| Example 7 | 35 | 20 | — | 5 | 40 | — | 20 | | 3 |

Table 3 below shows the evaluation results of the characteristics of the filling portions of the Comparative Examples and the Examples formed from the resin composition as described in Table 2, and the characteristics of the windows including the filling portions. In Table 3, the refractive index corresponds to a refractive index value of the filling portion formed from the resin composition of Table 2 described above at 589 nm, and a difference in refractive index was measured as a difference in refractive index between a glass substrate serving as a base substrate and a filling portion of a Comparative Example, or a difference in refractive index between a glass substrate and a filling portion of an Example at 589 nm. The value of the difference in refractive index in Table 3 corresponds to a value obtained by subtracting the refractive index value of the filling portion of Comparative Examples or Examples from the refractive index value of the glass substrate. In Table 3, the difference in Abbe No. was also measured as a difference in Abbe No. between the glass substrate serving as a base substrate and the filling portion of the Comparative Examples, and a difference in Abbe No. between the glass substrate and the filling portion of the Examples. The viewability and reflection color described in Table 3 are the results observed with the naked eye. The viewability was evaluated by visual perception of the filling portion in the windows of the Comparative Examples and the Examples, and the reflection color was the result obtained by visually observing the color reflected when external light was provided to the windows of the Comparative Examples and the Examples. In the viewability evaluation items of Table 3 below, "X" corresponds to a viewability state in which the filling portion is readily viewable with the naked eye and thus is classified as defective, and "O" corresponds to a satisfactory viewability state in which the filling portion is not readily viewable with the naked eye, and "◎" corresponds to an excellent viewability state in which the filling portion is not visually perceived.

Haze was measured using a D65 light source with an instrument of NDH200 (NIPPON DENSHOKU). The glass transition temperature Tg and elongation are evaluation results for the filling portions. The adhesion strength corresponds to a 180° peel strength of the filling portions of the Comparative Examples and the Examples using a glass substrate as an adherend.

When referring to the results of Examples 1 to 7, it is seen that the window according to an embodiment, including the acrylic monomer containing an aromatic aryl group moiety in an amount of about 10 wt % to about 40 wt % with respect to 100 wt % of the entire base resin, and nanoparticles in an amount of about 0.1 wt % to about 10 wt % with respect to 100 wt % of the base resin, maintained excellent mechanical properties and also showed excellent optical properties that prevent patterns from being viewed and reflection color from being observed.

A window according to an embodiment includes a base substrate and a filling portion that fills a concave portion defined on at least one surface of the base substrate, and a difference in refractive index between the filling portion and the base substrate is about 0.02 or less and a difference in Abbe No. between the filling portion and the base substrate

TABLE 3

| Item | Refractive index | Difference in refractive index | Abbe No. | Difference in Abbe No. | Viewability | Reflection color | Haze | Tg (° C.) | Elongation (%) | Adhesion strength (gf/inch) |
|---|---|---|---|---|---|---|---|---|---|---|
| Comparative Example 1 | 1.486 | −0.016 | 43.9 | 5.8 | X | White | 2.7 | −38 | 230 | 1180 |
| Comparative Example 2 | 1.493 | −0.009 | 41.4 | 8.3 | X | Yellow | 0.8 | −24 | 205 | 810 |
| Comparative Example 3 | 1.499 | −0.003 | 42.1 | 7.6 | ○ | Red | 0.3 | −18 | 225 | 1010 |
| Comparative Example 4 | 1.502 | 0.000 | 37.7 | 12 | ◎ | Purple | 0.2 | −34 | 250 | 1190 |
| Comparative Example 5 | 1.505 | 0.003 | 36.9 | 12.8 | ○ | Turquoise | 0.3 | −27 | 250 | 1140 |
| Example 1 | 1.502 | 0 | 48.4 | 1.3 | ◎ | None | 0.7 | −28 | 200 | 1070 |
| Example 2 | 1.502 | 0 | 49.3 | 0.4 | ◎ | None | 1.0 | −20 | 200 | 1000 |
| Example 3 | 1.502 | 0 | 47.6 | 2.1 | ◎ | None | 0.2 | −28 | 200 | 1030 |
| Example 4 | 1.502 | 0 | 48.2 | 1.5 | ◎ | None | 0.1 | −23 | 200 | 1060 |
| Example 5 | 1.502 | 0 | 45.1 | 4.6 | ◎ | None | 0.2 | −25 | 200 | 1050 |
| Example 6 | 1.503 | −0.001 | 46.2 | 3.5 | ◎ | None | 0.3 | −24 | 200 | 1020 |
| Example 7 | 1.503 | −0.001 | 49.7 | 0 | ◎ | None | 0.3 | −21 | 200 | 1000 |

Referring to the results of Table 3, Examples 1 to 7 exhibited characteristics in which the difference in refractive index value from the glass substrate as a base substrate was less than about 0.02, and the difference in Abbe No. from the glass substrate as a base substrate was less than about 5.0. Examples 1 to 7 included the acrylic monomer containing an aromatic aryl moiety in an amount of about 10 wt % to about 40 wt %, with respect to 100 wt % of the entire base resin, and thus showed a refractive index value within a range of about 1.49 to about 1.52. Examples 1 to 7, as compared to Comparative Examples 1 to 5, further included nanoparticles, and thus had an Abbe No. in a range of about 45 to about 50, and showed a difference in Abbe No. from the base substrate of about 5.0 or less. Examples 1 to 7 had the above-described refractive index and Abbe No. characteristics and thus exhibited excellent viewability that the filling portion was not viewed, and showed excellent optical properties in which reflection color was not observed, as compared to Comparative Examples 1 to 5. Examples 1 to 7 exhibited excellent mechanical properties such as a low glass transition temperature of about −20° C. or less and an elongation of about 200% or more, and excellent adhesive properties such as an adhesion strength of 1000 gf/inch or more, like Comparative Examples 1 to 5.

is about 5.0 or less, and accordingly, the window may thus exhibit excellent optical properties that prevent patterns from being viewed in the window due to the filling portion and prevent reflection color from being viewed due to external light. The window according to an embodiment includes an acrylic polymer resin formed from a base resin containing one or more types of acrylic monomers having an aromatic linker or an aromatic substituent in a filling portion of patterns formed in a folding region, and may thus maintain excellent mechanical properties and folding properties and also exhibit excellent optical properties.

A display device according to an embodiment includes a base substrate and a filling portion that fills a concave portion defined on at least one surface of the base substrate, which are disposed above a display module, and a difference in refractive index between the filling portion and the base substrate is about 0.02 or less and a difference in Abbe No. between the filling portion and the base substrate is about 5.0 or less, and accordingly, the display device may thus exhibit excellent display quality that prevents patterns from being viewed in the window due to the filling portion and prevents reflection color from being viewed due to external light.

A window according to an embodiment includes a filling portion filled with a filler having similar optical properties to those of a base substrate in a folding portion, and may thus have satisfactory folding properties and exhibit excellent optical properties that prevent reflection color from being viewed.

A display device according to an embodiment includes a window disposed above a display module and including a filling portion filled with a filler having similar optical properties to those of a base substrate in a folding portion, and may thus exhibit satisfactory folding properties and excellent display quality.

Embodiments have been disclosed herein, and although terms are employed, they are used and are to be interpreted in a generic and descriptive sense only and not for the purposes of limitation. In some instances, as would be apparent to one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the claims.

What is claimed is:

1. A window comprising:

a base substrate including a first surface and a second surface which face each other; and a filling portion, wherein the base substrate has a concave portion defined on at least one of the first surface and the second surface, a difference between a refractive index of the base substrate at a wavelength of about 589 nm and a refractive index of the filling portion at a wavelength of about 589 nm is less than or equal to about 0.02, a difference between an Abbe No. of the base substrate and an Abbe No. of the filling portion is less than or equal to about 5.0, the filling portion fills the concave portion, the base substrate is a glass substrate, and the filling portion comprises:

nanoparticles that include at least one of $Al_2O_3$ and glass particles; and an acrylic polymer resin.

2. The window of claim 1, wherein the window comprises:

a folding portion which is foldable with respect to a virtual folding axis extending in one direction; and a non-folding portion adjacent to the folding portion, and the concave portion is defined in the folding portion.

3. The window of claim 1, wherein the filling portion is formed through a polymerization reaction of a resin composition that comprises:

a base resin including two or more types of acrylic monomers that are different from each other;

a crosslinking agent;

a photoinitiator; and the nanoparticles.

4. The window of claim 3, wherein an amount of the nanoparticles in the resin composition is in a range of about 0.1 wt % to about 10 wt %, with respect to 100 wt % of the base resin.

5. The window of claim 3, wherein the base resin comprises an acrylic monomer represented by Formula 1:

[Formula 1]

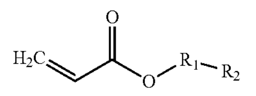

wherein in Formula 1, $R_1$ is O, a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms, $R_2$ is a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms, and at least one of $R_1$ and $R_2$ comprises a substituted or unsubstituted aryl group having 6 to 18 carbon atoms.

6. The window of claim 5, wherein an amount of the acrylic monomer represented by Formula 1 in the base resin is in a range of about 10 wt % to about 40 wt %, with respect to 100 wt % of the base resin.

7. The window of claim 1, wherein a refractive index of the filling portion is in a range of about 1.49 to about 1.51 at a wavelength of about 589 nm, and the filling portion has an Abbe No. in a range of about 45 to about 50.

8. The window of claim 7, wherein a glass transition temperature of the filling portion is less than or equal to about −20° C., and the filling portion has an elongation greater than or equal to about 200%.

9. The window of claim 1, further comprising:

a cover layer disposed on a surface of the base substrate in which the concave portion is defined, wherein the cover layer includes a same material as the filling portion.

10. The window of claim 9, wherein the cover layer is formed as a single body with the filling portion.

11. The window of claim 1, wherein a thickness of a portion of the base substrate in which the concave portion is not defined is greater than or equal to about 100 μm.

12. A display device comprising:

a display module; and a window disposed on the display module, wherein the window includes:

a base substrate including a first surface and a second surface which face each other; and a filling portion, the base substrate has a concave portion defined on at least one of the first surface and the second surface, a difference between a refractive index of the base substrate at a wavelength of about 589 nm and a refractive index of the filling portion at a wavelength of about 589 nm is less than or equal to about 0.02, a difference between an Abbe No. of the base substrate and an Abbe No. of the filling portion is less than or equal to about 5.0, the filling portion fills the concave portion, the base substrate is a glass substrate, and the filling portion comprises:

nanoparticles that include at least one of $Al_2O_3$ and glass particles; and an acrylic polymer resin.

13. The display device of claim 12, wherein the display module comprises:

a folding display portion which is foldable with respect to a folding axis extending in one direction; and a non-folding display portion adjacent to the folding display portion, the window comprises:

a folding portion corresponding to the folding display portion; and a non-folding portion corresponding to the non-folding display portion, and the concave portion is defined in the folding portion.

14. The display device of claim 12, wherein the acrylic polymer resin is formed through a polymerization reaction of a base resin comprising two or more types of acrylic monomers that are different from each other, and the base resin comprises an acrylic monomer represented by Formula 1:

[Formula 1]

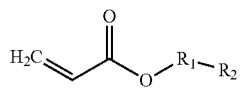

wherein in Formula 1, $R_1$ is O, a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms, $R_2$ is a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms, and at least one of $R_1$ and $R_2$ comprises a substituted or unsubstituted aryl group having 6 to 18 carbon atoms.

15. The display device of claim 14, wherein an amount of the nanoparticles in the display device is in a range of about 0.1 wt % to about 10 wt %, with respect to 100 wt % of the base resin.

16. The display device of claim 12, wherein a refractive index of the filling portion is in a range of about 1.49 to about 1.51 at a wavelength of about 589 nm, and the filling portion has an Abbe No. in a range of about 45 to about 50.

17. The display device of claim 16, wherein a glass transition temperature of the filling portion is less than or equal to about 31 20° C., and the filling portion has an elongation greater than or equal to about 200%.

18. The display device of claim 12, wherein the window further comprises:

a cover layer disposed on a surface of the base substrate in which the concave portion is defined, and the cover layer includes a same material as the filling portion.

19. A display device comprising:

a folding region which is foldable with respect to a virtual folding axis extending in one direction;

a non-folding region adjacent to the folding region;

a display module; and a window made of glass disposed on the display module, wherein the window includes:

a lower surface adjacent to the display module;

an upper surface facing the lower surface;

a concave portion depressed from at least one of the upper surface and the lower surface; and a filling portion filled in the concave portion, a refractive index of the filling portion is in a range of about 0.49 to about 1.51 at a wavelength of about 589 nm, the filling portion has an Abbe No. in a range of about 45 to about 50, a glass transition temperature of the filling portion is less than or equal to about −20° C., and the filling portion has an elongation greater than or equal to about 200%.

20. The display device of claim 19, wherein the filling portion comprises:

nanoparticles that include at least one of $Al_2O_3$ and glass particles; and an acrylic polymer resin.

21. The display device of claim 20, wherein the filling portion is formed through a polymerization reaction of a resin composition that comprises:

a base resin including two or more types of acrylic monomers that are different from each other, a crosslinking agent;

a photoinitiator; and the nanoparticles.

22. The display device of claim 21, wherein an amount of the nanoparticles in the resin composition is in a range of about 0.1 wt % to about 10 wt %, with respect to 100 wt % of the base resin.

23. The display device of claim 21, wherein the base resin comprises an acrylic monomer represented by Formula 1:

[Formula 1]

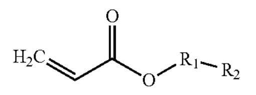

wherein in Formula 1, $R_1$ is O, a substituted or unsubstituted divalent alkyl group having 1 to 6 carbon atoms, a substituted or unsubstituted divalent alkoxy group having 1 to 6 carbon atoms, or a substituted or unsubstituted divalent aryl group having 6 to 18 carbon atoms, $R_2$ is a hydroxy group, a substituted or unsubstituted alkyl group having 1 to 6 carbon atoms, a substituted or unsubstituted alkoxy group having 1 to 6 carbon atoms, or a substituted or unsubstituted aryl group having 6 to 18 carbon atoms, and at least one of $R_1$ and $R_2$ comprises a substituted or unsubstituted aryl group having 6 to 18 carbon atoms.

24. The display device of claim 23, wherein an amount of the acrylic monomer represented by Formula 1 in the base resin is in a range of about 10 wt % to about 40 wt %, with respect to 100 wt % of the base resin.

* * * * *